United States Patent
Wang et al.

(10) Patent No.: US 11,840,642 B2
(45) Date of Patent: *Dec. 12, 2023

(54) COMPOSITE FILM WITH ANTI-REFLECTIVE COATING

(71) Applicant: SAINT-GOBAIN PERFORMANCE PLASTICS CORPORATION, Solon, OH (US)

(72) Inventors: Yongzhong Wang, Tucson, AZ (US); Robrecht Moerkerke, Kortrijk (BE); Fabien Lienhart, Paris (FR)

(73) Assignee: SAINT-GOBAIN PERFORMANCE PLASTICS CORPORATION, Solon, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/157,959

(22) Filed: Jan. 23, 2023

(65) Prior Publication Data

US 2023/0159764 A1     May 25, 2023

Related U.S. Application Data

(63) Continuation of application No. 16/441,161, filed on Jun. 14, 2019, now Pat. No. 11,584,856.

(60) Provisional application No. 62/687,560, filed on Jun. 20, 2018.

(51) Int. Cl.

| | |
|---|---|
| *B32B 27/36* | (2006.01) |
| *B32B 7/12* | (2006.01) |
| *C09D 4/00* | (2006.01) |
| *B32B 27/08* | (2006.01) |
| *C08K 9/06* | (2006.01) |
| *C08K 9/04* | (2006.01) |
| *C08K 3/36* | (2006.01) |
| *C09D 5/00* | (2006.01) |
| *C09D 135/02* | (2006.01) |
| *C09D 7/40* | (2018.01) |

(52) U.S. Cl.
CPC .............. *C09D 5/006* (2013.01); *B32B 7/12* (2013.01); *B32B 27/08* (2013.01); *B32B 27/36* (2013.01); *C09D 4/00* (2013.01); *C09D 7/67* (2018.01); *C09D 7/68* (2018.01); *C09D 135/02* (2013.01); *B32B 2255/10* (2013.01); *B32B 2255/26* (2013.01); *C08K 3/36* (2013.01); *C08K 9/04* (2013.01); *C08K 9/06* (2013.01); *C08K 2201/005* (2013.01); *C08K 2201/011* (2013.01)

(58) Field of Classification Search
None
See application file for complete search history.

(56) References Cited

U.S. PATENT DOCUMENTS

| | | | |
|---|---|---|---|
| 7,615,283 B2 | 11/2009 | Radcliffe et al. | |
| 8,795,825 B2 | 8/2014 | Kim et al. | |
| 9,482,789 B2 | 11/2016 | Kim et al. | |
| 11,584,856 B2 * | 2/2023 | Wang | C09D 5/006 |
| 2006/0269733 A1 | 11/2006 | Mizuno et al. | |
| 2007/0163705 A1 | 7/2007 | Dollase et al. | |
| 2007/0238804 A1 | 10/2007 | Ho et al. | |
| 2010/0165276 A1 | 7/2010 | David et al. | |
| 2011/0164322 A1 | 7/2011 | Morozumi et al. | |
| 2013/0071646 A1 | 3/2013 | Kim et al. | |
| 2013/0186466 A1 | 7/2013 | Hebrink et al. | |
| 2013/0216807 A1 | 8/2013 | Wakefield et al. | |
| 2013/0222915 A1 | 8/2013 | Kim et al. | |
| 2014/0057115 A1 | 2/2014 | Treadway | |
| 2015/0301231 A1 | 10/2015 | Yang et al. | |

FOREIGN PATENT DOCUMENTS

| | | |
|---|---|---|
| CN | 101775254 A | 7/2010 |
| CN | 102129090 A | 7/2011 |
| CN | 103214888 A | 7/2013 |
| CN | 103755995 A | 4/2014 |
| CN | 104937052 A | 9/2015 |
| JP | 2011122005 A | 6/2011 |
| JP | 2013076969 A | 4/2013 |
| JP | 2014531608 A | 11/2014 |
| JP | 2018028693 A | 2/2018 |
| KR | 20110133263 A | 12/2011 |
| KR | 20130021182 A | 3/2013 |
| KR | 10-2013-0120223 A | 11/2013 |
| KR | 101518874 B1 | 5/2015 |
| TW | 201129654 A1 | 9/2011 |
| TW | 201309765 A1 | 3/2013 |
| TW | 201627483 A | 8/2016 |

(Continued)

OTHER PUBLICATIONS

Macarie Lavinia et al., The Influence of Temperature and Photoinitiator Concentration on Photoinitiated Polymerization of Diacrylate Monomer, Central European Journal of Chemistry, Dec. 1, 2005, p. 721-730, vol. 3, No. 4.

(Continued)

*Primary Examiner* — Sheeba Ahmed
(74) *Attorney, Agent, or Firm* — Abel Schillinger, LLP; Chi Suk Kim

(57) ABSTRACT

A composite film may include a first transparent substrate and a first anti-reflective coating overlying a first surface of the first transparent substrate. The first anti-reflective coating may include a first UV curable acrylate binder, a photo initiator component, and silica nanoparticles dispersed within the first anti-reflective coating. The first anti-reflective coating may further include a ratio $AC1_{SiO2}/AC1_B$ of at least about 0.01 and not greater than about 1.3. The composite film may further have a VLT of at least about 93.0% and a haze value of not greater than about 3%.

20 Claims, 8 Drawing Sheets

(56) References Cited

FOREIGN PATENT DOCUMENTS

TW 201807108 A 3/2018
WO 2011140018 A1 11/2011

OTHER PUBLICATIONS

International Search Report and Written Opinion for PCT Application No. PCT/US2019/037147, dated Oct. 18, 2019, 13 pages.

* cited by examiner

COMPOSITE FILM WITH ANTI-REFLECTIVE COATING

CROSS-REFERENCE TO RELATED APPLICATION(S)

This application is a continuation of and claims priority under 35 U.S.C. § 120 to U.S. patent application Ser. No. 16/441,161, entitled "COMPOSITE FILM WITH ANTI-REFLECTIVE COATING," filed Jun. 14, 2019, naming as inventors Yongzhong WANG et al., which claims priority under 35 U.S.C. § 119(e) to U.S. Provisional Patent Application No. 62/687,560, entitled "COMPOSITE FILM WITH ANTI-REFLECTIVE COATING," filed Jun. 20, 2018, naming as inventors Yongzhong WANG et al., both of which are assigned to the current assignee hereof and incorporated herein by reference in their entireties.

FIELD OF THE DISCLOSURE

The present disclosure relates to a composite film. In particular, the present disclosure relates to a composite film having an anti-reflective coating with particular solar energy and optical characteristics.

BACKGROUND

Composite films can be used as coverings applied to various glass components to strength the glass and to control the passage of solar radiation through transmission, reflection, and absorption. For certain composite film applications, such as, for example, applications on or coverings of medical glass components including medical hoods, protective shields and protective glasses, the composite films must exhibit high visible light transmittance ("VLT"), a low haze value and a low reflectance. This combination of features is of great importance for particular systems. As such, a continuing need exists for improved composite films to use in such applications.

SUMMARY

According to a first aspect, a composite film may include a first transparent substrate and a first anti-reflective coating overlying a first surface of the first transparent substrate. The first anti-reflective coating may include a first ultraviolet light (UV) curable acrylate binder, a photo initiator component, and silica nanoparticles dispersed within the first anti-reflective coating. The first anti-reflective coating may further include a ratio $AC1_{SiO2}/AC1_B$ of at least about 0.01 and not greater than about 1.3, where $AC1_{SiO2}$ is the concentration of the silica nanoparticles in the first anti-reflective coating in weight percent for a total weight of the first anti-reflective coating and $AC1_B$ is the concentration of the first UV curable acrylate binder in the first anti-reflective coating in weight percent for a total weight of the first anti-reflective coating. The composite film may further have a VLT of at least about 93.0% and a haze value of not greater than about 3%.

According to yet another aspect, a composite film may include a composite film that may include a first transparent substrate and a first anti-reflective coating overlying a first surface of the first transparent substrate. The first anti-reflective coating may include a first UV curable acrylate binder, a photo initiator component, and silica nanoparticles dispersed within the first anti-reflective coating. The first anti-reflective coating may include the first UV curable acrylate binder at a concentration of at least about 40 wt. % and not greater than about 95 wt. % for a total weight of the first anti-reflective coating. The first anti-reflective coating may further include a photo initiator component at a concentration of at least about 2.0 wt. % and not greater than about 10 wt. % for a total weight of the first anti-reflective coating. The first anti-reflective coating may also include silica nanoparticles at a concentration of at least about 5 wt. % and not greater than about 60 wt. % for a total weight of the first anti-reflective coating. The composite film may further have a VLT of at least about 93.0% and a haze value of not greater than about 3%.

According to still another aspect, a method of forming a composite film may include providing a first anti-reflective coating formulation, applying the first anti-reflective coating formulation to a transparent substrate, and drying the first anti-reflective coating formulation to form a composite film that may include a first anti-reflective coating overlying the transparent substrate. The first anti-reflective coating formulation may include a raw first UV curable acrylate binder component, a raw photo initiator component, and silica nanoparticles. The first anti-reflective coating formulation may include the first raw UV curable acrylate binder component at a concentration of at least about 0.4 wt. % and not greater than about 5.5 wt. % for a total weight of the first anti-reflective coating. The first anti-reflective coating formulation may further include a raw photo initiator component at a concentration of at least about 0.2 wt. % and not greater than about 2.0 wt. % for a total weight of the first anti-reflective coating formulation. The first anti-reflective coating formulation may also include silica nanoparticles at a concentration of at least about 0.7 wt. % and not greater than about 1.9 wt. % for a total weight of the first anti-reflective coating. The composite film may further have a VLT of at least about 93.0% and a haze value of not greater than about 3%.

According to still another aspect, a method of forming a composite film may include providing a first anti-reflective coating formulation, applying the first anti-reflective coating formulation to a transparent substrate, and drying the first anti-reflective coating formulation to form a composite film that may include a first anti-reflective coating overlying the transparent substrate. The first anti-reflective coating formulation may include a raw first UV curable acrylate binder component, a raw photo initiator component, and silica nanoparticles. The first anti-reflective coating formed by the method may include a first UV curable acrylate binder, a photo initiator component, and silica nanoparticles dispersed within the first anti-reflective coating. The first anti-reflective coating may further include a ratio $AC1_{SiO2}/AC1_B$ of at least about 0.01 and not greater than about 1.3, where $AC1_{SiO2}$ is the concentration of the silica nanoparticles in the first anti-reflective coating in weight percent for a total weight of the first anti-reflective coating and $AC1_B$ is the concentration of the first UV curable acrylate binder in the first anti-reflective coating in weight percent for a total weight of the first anti-reflective coating. The composite film may further have a VLT of at least about 93.0% and a haze value of not greater than about 3%.

According to still another aspect, a method of forming a composite film may include providing a first anti-reflective coating formulation, applying the first anti-reflective coating formulation to a transparent substrate, and drying the first anti-reflective coating formulation to form a composite film that may include a first anti-reflective coating overlying the transparent substrate. The first anti-reflective coating formulation may include a raw first UV curable acrylate binder component, a raw photo initiator component, and silica nanoparticles. The first anti-reflective coating formed by the method may include a first UV curable acrylate binder, a photo initiator component, and silica nanoparticles dispersed within the first anti-reflective coating. The first anti-reflective coating formed by the method may include the first UV curable acrylate binder at a concentration of at least about 40 wt. % and not greater than about 95 wt. % for a total weight of the first anti-reflective coating. The first anti-reflective coating formed by the method may further include a photo initiator component at a concentration of at least about 2.0 wt. % and not greater than about 10 wt. % for a total weight of the first anti-reflective coating. The first anti-reflective coating formed by the method may also include silica nanoparticles at a concentration of at least about 5 wt. % and not greater than about 60 wt. % for a total weight of the first anti-reflective coating. The composite film may further have a VLT of at least about 93.0% and a haze value of not greater than about 3%.

BRIEF DESCRIPTION OF THE DRAWINGS

Embodiments are illustrated by way of example and are not limited to the accompanying figures.

Figure 1:
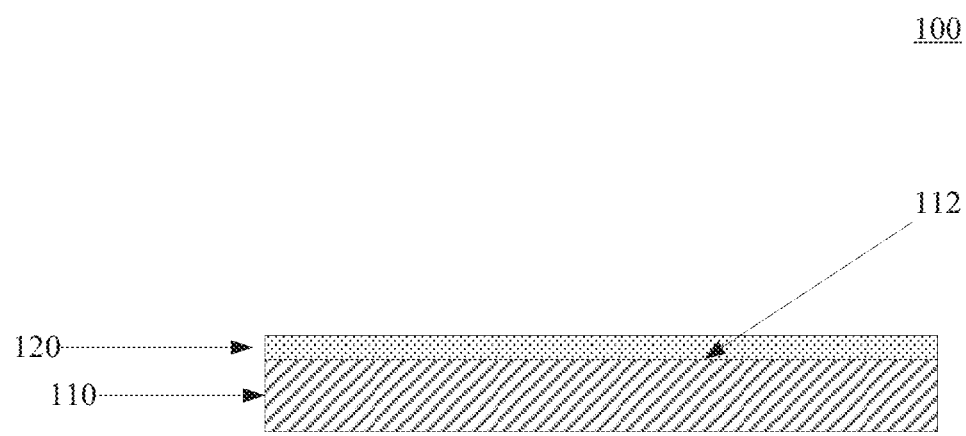
FIG. 1 includes an illustration of an example composite film according to certain embodiments described herein.

Skilled artisans appreciate that elements in the figures are illustrated for simplicity and clarity and have not necessarily been drawn to scale.

DETAILED DESCRIPTION

The following discussion will focus on specific implementations and embodiments of the teachings. The detailed description is provided to assist in describing certain embodiments and should not be interpreted as a limitation on the scope or applicability of the disclosure or teachings. It will be appreciated that other embodiments can be used based on the disclosure and teachings as provided herein.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item.

As used herein, the term "visible light transmittance" or "VLT" refers to the ratio of total light visible to the human eye (i.e., having a wavelength between 380 nm and 780 nanometers) that is transmitted through a composite stack/transparent substrate system and may be measured according to T-H ASTM C method by using a Haze Gard instrument from BYK.

As used herein, the term "haze value" refers to the percentage of light transmitted through a composite film that is deflected more than 2.5° from the direction of the incoming beam and may be measured according to T-H ASTM-C method using a Haze Gard instrument from BYK.

As used herein, the term "reflectance" refers to a measure of visible light that is reflected from a composite film surface when illuminated by a light source and may be measured according to ASTM E-1349 by using a HunterLab instrument.

Embodiments described herein are generally directed to composite films that may include a first transparent substrate and a first anti-reflective coating overlying a first surface of the first transparent substrate. The first anti-reflective coating may include a first UV curable acrylate binder, a photo initiator component, and silica nanoparticles dispersed within the first anti-reflective coating. The composite film formed according to embodiments described herein may have particular characteristics, such as, high VLT, low haze values, low reflectance or a combination of thereof.

These concepts are better understood in view of the embodiments described below that illustrate and do not limit the scope of the present disclosure.

FIG. 1 includes an illustration of a cross-sectional view of a portion of an example composite film 100 according to embodiments described herein. As shown in FIG. 1, the composite film 100 may include a first transparent substrate 110 and a first anti-reflective coating 120 overlying a first surface 112 of the first transparent substrate 110.

According to particular embodiments, the composite film 100 may have a particular VLT. For example, the composite film 100 may have a VLT of at least about 93.2%, such as, at least about 93.4% or at least about 93.6% or at least about 93.8% or at least about 94.0% or at least about 94.2% or at least about 94.4% or at least about 94.6% or at least about 94.8% or at least about 95.0% or at least about 95.2% or at least about 95.4% or at least about 95.6% or at least about 95.8% or even at least about 96.0%. According to still other embodiments, the composite film 100 may have a VLT of not greater than about 99.9%. It will be appreciated that the composite film 100 may have a VLT within a range between, and including, any of the minimum and maximum values noted above. It will be further appreciated that the composite film 100 may have a VLT of any value between, and including, any of the minimum and maximum values noted above.

According to still other embodiments, the composite film 100 may have a particular haze value. For example, the composite film 100 may have a haze value of not greater than about 3.0%, such as, not greater than about 2.9% or not greater than about 2.8% or not greater than about 2.7% or not greater than about 2.6% or not greater than about 2.5% or not greater than about 2.4% or not greater than about 2.3% or not greater than about 2.2% or not greater than about 2.1% or not greater than about 2.0% or not greater than about 1.9% or not greater than about 1.8% or not greater than about 1.7% or not greater than about 1.6% or not greater than about 1.5% or not greater than about 1.4% or even not greater than about 1.3%. It will be appreciated that the composite film 100 may have a haze value within a range between, an including, any of the values noted above. It will be further appreciated that the composite film 100 may have a haze value of any value between, and including, any of the values noted above.

According to yet other embodiments, the composite film 100 may have a particular reflectance. For example, the composite film 100 may have a reflectance of not greater than about 7.0%, such as, not greater than about 6.9% or not greater than about 6.8% or not greater than about 6.7% or not greater than about 6.6% or not greater than about 6.5% or not greater than about 6.4% or not greater than about 6.3% or not greater than about 6.2% or not greater than about 6.1% or not greater than about 6.0% or not greater than about 5.9% or not greater than about 5.8% or not greater than about 5.7% or not greater than about 5.6% or not greater than about 5.5% or not greater than about 5.4% or not greater than about 5.3% or not greater than about 5.2% or not greater than about 5.1% or not greater than about 5.0%. It will be appreciated that the composite film 100 may have a reflectance within a range between, an including, any of the minimum and maximum values noted above. It will be further appreciated that the composite film 100 may have a reflectance of any value between, and including, any of the minimum and maximum values noted above.

According to still other embodiments, the first anti-reflective coating 120 may have a particular thickness. For example, the first anti-reflective coating 120 may have a thickness of at least about 50 nm, such as, at least about 60 nm or at least about 70 nm or at least about 80 nm or at least about 90 nm or at least about 100 nm or at least about 110 nm or at least about 120 nm or at least about 130 nm or at least about 140 nm or at least about 150 nm or at least about 160 nm or at least about 170 nm or at least about 180 nm or at least about 190 nm or even at least about 200 nm. According to still other embodiments, the anti-reflective coating 120 may have a thickness of not greater than about 500 nm, such as, not greater than about 490 nm or not greater than about 480 nm or not greater than about 470 nm or not greater than about 460 nm or not greater than about 450 nm or not greater than about 440 nm or not greater than about 430 nm or not greater than about 420 nm or not greater than about 410 nm or not greater than about 400 nm or not greater than about 390 nm or not greater than about 380 nm or not greater than about 370 nm or not greater than about 360 nm or not greater than about 350 nm or not greater than about 340 nm or not greater than about 330 nm or not greater than about 320 nm or not greater than about 310 nm or even not greater than about 300 nm. It will be appreciated that the first anti-reflective coating 120 may have a thickness within a range between, an including, any of the minimum and maximum values noted above. It will be further appreciated that the first anti-reflective coating 120 may have a thickness of any value between, and including, any of the minimum and maximum values noted above.

According to still other embodiments, the first anti-reflective coating 120 may have a particular ratio $AC1_{SiO2}/AC1_B$, where $AC1_{SiO2}$ is the concentration of the silica nanoparticles in the first anti-reflective coating 120 in weight percent for a total weight of the first anti-reflective coating 120 and $AC1_B$ is the concentration of the first UV curable acrylate binder in the first anti-reflective coating 120 in weight percent for a total weight of the first anti-reflective coating 120. For example, the first anti-reflective coating 120 may have a ratio $AC1_{SiO2}/AC1_B$ of at least about 0.01, such as, at least about 0.05 or at least about 0.07 or at least about 0.1 or at least about 0.12 or at least about 0.15 or at least about 0.17 or at least about 0.20 or at least about 0.22 or at least about 0.25 or at least about 0.27 or even at least about 0.30. According to still other embodiments, the first anti-reflective coating 120 may have a ratio $AC1_{SiO2}/AC1_B$ of not greater than about 1.3, such as, not greater than about 1.2 or not greater than about 1.1 or not greater than about 1.0 or not greater than about 0.9 or not greater than about 0.8 or not greater than about 0.7 or not greater than about 0.6 or even not greater than about 0.5. It will be appreciated that the first anti-reflective coating 120 may have a ratio $AC1_{SiO2}/AC1_B$ within a range between, an including, any of the minimum and maximum values noted above. It will be further appreciated that the first anti-reflective coating 120 may have a ratio $AC1_{SiO2}/AC1_B$ of any value between, and including, any of the minimum and maximum values noted above.

According to yet other embodiments, the first anti-reflective coating 120 may include a first UV curable acrylate binder. According to still other embodiments, the first UV curable acrylate binder in the first anti-reflective coating 120 may be, for example, SR351LV, SR355, SR399, tetrafunctional acrylate monomer, pentafunctional acrylate monomers, pentaerythritol Tri-Tetraacrylate (PETIA), Ebecry 140, Ebecryl 180, multifunctional oligomers, or UV resins.

According to still other embodiments, the first anti-reflective coating 120 may include a particular concentration of the first UV curable acrylate binder. For example, the first anti-reflective coating 120 may have a first UV curable acrylate binder concentration of at least about 40 wt. % for a total weight of the first anti-reflective coating, such as, at least about 42 wt. % or at least about 44 wt. % or at least about 46 wt. % or at least about 48 wt. % or at least about 50 wt. % or at least about 52 wt. % or at least about 54 wt. % or at least about 56 wt. % or at least about 58 wt. % or even at least about 60 wt. %. According to yet other embodiments, the first anti-reflective coating 120 may have a first UV curable acrylate binder concentration of not greater than about 95 wt. % for a total weight of the first anti-reflective coating, such as, not greater than about 93 wt. % or not greater than about 90 wt. % or not greater than about 88 wt. % or not greater than about 85 wt. % or not greater than about 83 wt. % or not greater than about 80 wt. % or not greater than about 78 wt. % or not greater than about 75 wt. % or not greater than about 73 wt. % or even not greater than about 70 wt. %. It will be appreciated that the first anti-reflective coating 120 may have a first UV curable acrylate binder concentration within a range between, an including, any of the minimum and maximum values noted above. It will be further appreciated that the first anti-reflective coating 120 may have a first UV curable acrylate binder concentration of any value between, and including, any of the minimum and maximum values noted above.

According to yet other embodiments, the first anti-reflective coating 120 may include a photo initiator component. According to still other embodiments, the photo initiator component in the first anti-reflective coating 120 may be Omnirad 184, Omnirad 819, Omnirad 1173, CPI 6976, other similar photo initiators, or any combinations of the above.

According to still other embodiments, the first anti-reflective coating 120 may include a particular concentration of the photo initiator component. For example, the first anti-reflective coating 120 may have a photo initiator component concentration of at least about 2 wt. % for a total weight of the first anti-reflective coating, such as, at least about 2.2 wt. % or at least about 2.5 wt. % or at least about 2.7 wt. % or at least about 3.0 wt. % or at least about 3.2 wt. % or at least about 3.5 wt. % or at least about 3.7 wt. % or at least about 4.0 wt. % or at least about 4.2 wt. % or at least about 4.5 wt. % or at least about 4.7 wt. % or at least about 5.0 wt. % or at least about 5.2 wt. % or even at least about 5.5 wt. %. According to yet other embodiments, the first anti-reflective coating 120 may have a photo initiator component concentration of not greater than about 10 wt. % for a total weight of the first anti-reflective coating, such as, not greater than about 9.8 wt. % or not greater than about 9.5 wt. % or not greater than about 9.3 wt. % or not greater than about 9.0 wt. % or not greater than about 8.8 wt. % or not greater than about 8.5 wt. % or not greater than about 8.3 wt. % or not greater than about 8.0 wt. % or not greater than about 7.8 wt. % or not greater than about 7.5 wt. % or not greater than about 7.3 wt. % or not greater than about 7.0 wt. % or not greater than about 6.8 wt. % or even not greater than about 6.5 wt. %. It will be appreciated that the first anti-reflective coating 120 may have a photo initiator component concentration within a range between, an including, any of the minimum and maximum values noted above. It will be further appreciated that the first anti-reflective coating 120 may have a photo initiator component concentration of any value between, and including, any of the minimum and maximum values noted above.

According to still other embodiments, the first anti-reflective coating 120 may include a particular concentration of silica nanoparticles. For example, the first anti-reflective coating 120 may have a silica nanoparticles concentration of at least about 5 wt. % for a total weight of the first anti-reflective coating, such as, at least about 6 wt. % or at least about 7 wt. % or at least about 8 wt. % or at least about 9 wt. % or at least about 10 wt. % or at least about 11 wt. % or at least about 12 wt. % or at least about 13 wt. % or at least about 14 wt. % or at least about 15 wt. % or at least about 16 wt. % or at least about 17 wt. % or at least about 18 wt. % or at least about 19 wt. % or at least about 20 wt. % or at least about 21 wt. % or at least about 22 wt. % or at least about 23 wt. % or at least about 24 wt. % or even at least about 25 wt. %. According to yet other embodiments, the first anti-reflective coating 120 may have a silica nanoparticles concentration of not greater than about 60 wt. % or a total weight of the first anti-reflective coating, such as, not greater than about 58 wt. % or not greater than about 55 wt. % or not greater than about 53 wt. % or not greater than about 50 wt. % or not greater than about 48 wt. % or not greater than about 45 wt. % or not greater than about 43 wt. % or not greater than about 40 wt. % or not greater than about 38 wt. % or not greater than about 35 wt. % or not greater than about 33 wt. % or even not greater than about 30 wt. %. It will be appreciated that the first anti-reflective coating 120 may have a silica nanoparticles concentration within a range between, an including, any of the minimum and maximum values noted above. It will be further appreciated that the first anti-reflective coating 120 may have a silica nanoparticles concentration of any value between, and including, any of the minimum and maximum values noted above.

According to still other embodiments, the silica nanoparticles in the first anti-reflective coating 120 may be surface treated silica nanoparticles. According to other embodiments, the silica nanoparticles in the first anti-reflective coating 120 may be generally solid spherical silica nanoparticles.

According to yet other embodiments, the first anti-reflective coating 120 may be surface treated with polysiloxane, acrylate or a combination thereof.

According to yet other embodiments, the silica nanoparticles in the first anti-reflective coating 120 may have a particular average particle size (D50). For purposes of embodiments described herein, average particle size (D50) is measured according to ASTM E2490. According to certain embodiments, the silica nanoparticles in the first anti-reflective coating 120 may have an average particle size (D50) of at least about 1 nm, such as, at least about 2 nm or at least about 3 nm or at least about 4 nm or at least about 5 nm or at least about 6 nm or at least about 7 nm or at least about 8 nm or at least about 10 nm or at least about 11 nm or at least about 12 nm or at least about 13 nm or at least about 14 nm or at least about 15 nm or at least about 16 nm or at least about 17 nm or even at least about 18 nm. According to other embodiments, the silica nanoparticles in the first anti-reflective coating 120 may have an average particle size (D50) of not greater than about 500 nm, such as, not greater than about 400 nm or not greater than about 300 nm or not greater than about 200 nm or not greater than about 100 nm or not greater than about 95 nm or not greater than about 90 nm or not greater than about 85 nm or not greater than about 80 nm or not greater than about 75 nm or not greater than about 65 nm or not greater than about 60 nm or not greater than about 55 nm or not greater than about 50 nm or not greater than about 45 nm or not greater than about 40 nm or not greater than about 35 nm or not greater than about 30 nm or even not greater than about 25 nm. It will be appreciated that the silica nanoparticles in the first anti-reflective coating 120 may have an average particle size (D50) within a range between, an including, any of the minimum and maximum values noted above. It will be further appreciated that the silica nanoparticles in the first anti-reflective coating 120 may have an average particle size (D50) of any value between, and including, any of the minimum and maximum values noted above.

According to yet other embodiments, the first anti-reflective coating 120 may further include a slip agent. According to still other embodiments, the slip agent may be any known slip agent used in the wet coating industry, for example, Tego glide 410, Tegorad 2100, Tegorad 2300, Tegorad 2500, BYK306, BYK307, and any combination thereof.

According to yet other embodiments, the first anti-reflective coating 120 may include a particular concentration of the slip agent. For example, the first anti-reflective coating 120 may have a slip agent concentration of at least about 0.01 wt. % for a total weight of the first anti-reflective coating or at least about 0.5 wt. % or even at least about 1.0 wt. %. According to still other embodiments, the first anti-reflective coating 120 may have a slip agent concentration of not greater than about 5 wt. % for a total weight of the first anti-reflective coating or not greater than about 4.5 wt. % or not greater than about 4.0 wt. %. It will be appreciated that the first anti-reflective coating 120 may have a slip agent concentration within a range between, an including, any of the minimum and maximum values noted above. It will be further appreciated that the first anti-reflective coating 120 may have a slip agent concentration of any value between, and including, any of the minimum and maximum values noted above.

According to yet other embodiments, the first anti-reflective coating 120 may further include a wetting agent. According to still other embodiments, the wetting agent may be any known wetting agent used in the wet coating industry, for example, BYK-377, BYK-UV 3500, Tego 270, or any combination thereof.

According to yet other embodiments, the first anti-reflective coating 120 may include a particular concentration of the wetting agent. For example, the first anti-reflective coating 120 may have a wetting agent concentration of at least about 0.01 wt. % for a total weight of the first anti-reflective coating or at least about 0.05 wt. % or at least about 0.1 wt. %. According to still other embodiments, the first anti-reflective coating 120 may have a wetting agent concentration of not greater than about 0.3 wt. % for a total weight of the first anti-reflective coating or not greater than about 0.25 wt. % or even not greater than about 0.2 wt. %. It will be appreciated that the first anti-reflective coating 120 may have a slip agent concentration within a range between, an including, any of the minimum and maximum values noted above. It will be further appreciated that the first anti-reflective coating 120 may have a wetting agent concentration of any value between, and including, any of the minimum and maximum values noted above.

According to yet other embodiments, the first anti-reflective coating 120 may further include a surface energy modifier. According to still other embodiments, the surface energy modifier may be any known surface energy modifier used in the wet coating industry, for example, BYK-315, BYK-300, BYK-310, BY-378, or any combination thereof.

According to yet other embodiments, the first anti-reflective coating 120 may include a particular concentration of the surface energy modifier. For example, the first anti-reflective coating 120 may have a surface energy modifier concentration of at least about 0.01 wt. % for a total weight of the first anti-reflective coating or at least about 0.05 wt. % or at least about 0.1 wt. %. According to still other embodiments, the first anti-reflective coating 120 may have a surface energy modifier concentration of not greater than about 0.30 wt. % for a total weight of the first anti-reflective coating or not greater than about 0.25 wt. % or even not greater than about 0.2 wt. %. It will be appreciated that the first anti-reflective coating 120 may have a surface energy modifier concentration within a range between, an including, any of the minimum and maximum values noted above. It will be further appreciated that the first anti-reflective coating 120 may have a surface energy modifier concentration of any value between, and including, any of the minimum and maximum values noted above.

According to yet other embodiments, the first anti-reflective coating 120 may further include a second UV curable acrylate binder. According to still other embodiments, the second UV curable acrylate binder may be SR351LV, SR355, SR399, tetrafunctional acrylate monomer, pentafunctional acrylate monomers, pentaerythritol Tri-Tetraacrylate (PETIA), Ebecry 140, Ebecryl 180, multifunctional oligomers, or UV resins.

According to yet other embodiments, the first anti-reflective coating 120 may include a particular concentration of the second UV curable acrylate binder. For example, the first anti-reflective coating 120 may have a second UV curable acrylate binder concentration of at least about 5.0 wt. % for a total weight of the first anti-reflective coating or at least about 7 wt. % or at least about 10 wt. % or at least about 12 wt. % or at least about 15 wt. % or at least about 17 wt. % or at least about 20 wt. % or at least about 22 wt. % or even at least about 25 wt. %. According to still other embodiments, the first anti-reflective coating 120 may have a second UV curable acrylate binder concentration of not greater than about 60 wt. % for a total weight of the first anti-reflective coating or not greater than about 58 wt. % or not greater than about 55 wt. % or not greater than about 53 wt. % or not greater than about 50 wt. % or not greater than about 48 wt. % or not greater than about 45 wt. % or not greater than about 43 wt. % or not greater than about 40 wt. %. It will be appreciated that the first anti-reflective coating 120 may have a second UV curable acrylate binder concentration within a range between, an including, any of the minimum and maximum values noted above. It will be further appreciated that the first anti-reflective coating 120 may have a second UV curable acrylate binder concentration of any value between, and including, any of the minimum and maximum values noted above.

According to still other embodiments, the first transparent substrate 110 may have a particular thickness. For example, the first transparent substrate 110 may have a thickness of at least about 5 mil, such as, at least about 6 mil or at least about 7 mil or at least about 8 mil or at least about 9 mil or even at least about 10 mil. According to yet other embodiments, the first transparent substrate 110 may have a thickness of not greater than about 15 mil, such as, not greater than about 14 mil or not greater than about 13 mil or not greater than about 12 mil or not greater than about 11 mil. It will be appreciated that the thickness of the first transparent substrate 110 may be within a range between, an including, any of the minimum and maximum values noted above. It will be further appreciated that the thickness of the first transparent substrate 110 may be any value between, and including, any of the minimum and maximum values noted above.

According to still other embodiments, the first transparent substrate 110 may be multiple transparent films laminated together by an adhesive. For example, the first transparent substrate 110 may be at least 2 films laminated together by an adhesive or at least 3 films laminated together by an adhesive or at least 4 films laminated together by an adhesive or at least 5 films laminated together by an adhesive or at least 6 films laminated together by an adhesive or at least 7 films laminated together by an adhesive or at least 8 films laminated together by an adhesive or at least 9 films laminated together by an adhesive or at least 10 films laminated together by an adhesive or at least 11 films laminated together by an adhesive or at least 12 films laminated together by an adhesive or at least 13 films laminated together by an adhesive or at least 14 or even 15 films laminated together.

According to yet other embodiments, the first transparent substrate 110 may include a polyethylene terephthalate (PET) film. According to still other embodiments, the first transparent substrate 110 may consist of a PET film. According to other embodiments, the transparent substrate 110 may include an optically clear PET film. According to yet other embodiments, the transparent substrate 110 may consist of an optically clear PET film. According to other embodiments, the transparent substrate 110 may include a single layer optically clear PET film. According to yet other embodiments, the transparent substrate 110 may consist of a single layer optically clear PET film.

According to still other embodiments, the PET film of the first transparent substrate 110 may have a particular thickness. For example, the PET film of the first transparent substrate 110 may have a thickness of at least about 5 mil, such as, at least about 6 mil or at least about 7 mil or at least about 8 mil or at least about 9 mil or even at least about 10 mil. According to yet other embodiments, the PET film of the first transparent substrate 110 may have a thickness of not greater than about 15 mil, such as, not greater than about 14 mil or not greater than about 13 mil or not greater than about 12 mil or not greater than about 11 mil. It will be appreciated that the thickness of the PET film of the first transparent substrate 110 may be within a range between, an including, any of the minimum and maximum values noted above. It will be further appreciated that the thickness of the PET film of the first transparent substrate 110 may be any value between, and including, any of the minimum and maximum values noted above.

Figure 2:
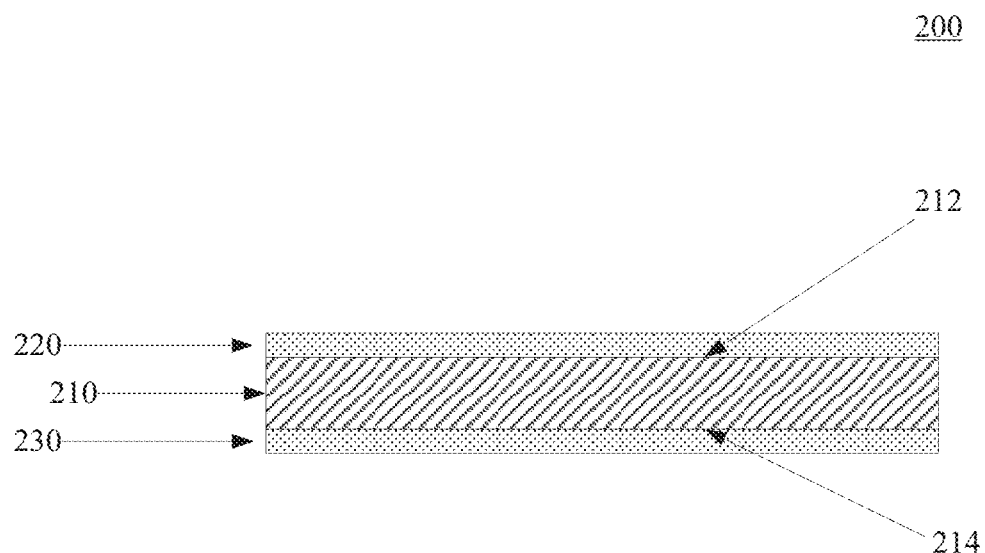
FIG. 2 includes an illustration of another example composite film according to certain embodiments described herein.

FIG. 2 includes an illustration of a cross-sectional view of a portion of another example composite film 200 according to embodiments described herein. As shown in FIG. 2, the composite film 200 may include a first transparent substrate 210, a first anti-reflective coating 220 overlying a first surface 212 of the first transparent substrate 210 and a second anti-reflective coating 230 overlying a second surface 214 of the first transparent substrate 210.

It will be appreciated that the composite film 200 and all components described in reference to the composite film 200 as shown in FIG. 2 may have any of the characteristics described herein with reference to corresponding components in FIG. 1. In particular, the characteristics of the composite film 200, the transparent substrate 210, and the first anti-reflective coating 220 shown in FIG. 2 may have any of the corresponding characteristics described herein in reference to composite film 100, the transparent substrate 110, and the first anti-reflective coating 120 shown in FIG. 1, respectively.

According to particular embodiments, the composite film 200 may have a particular VLT. For example, the composite film 200 may have a VLT of at least about 93.2%, such as, at least about 93.4% or at least about 93.6% or at least about 93.8% or at least about 94.0% or at least about 94.2% or at least about 94.4% or at least about 94.6% or at least about 94.8% or at least about 95.0% or at least about 95.2% or at least about 95.4% or at least about 95.6% or at least about 95.8% or even at least about 96.0%. According to still other embodiments, the composite film 200 may have a VLT of not greater than about 99.9%. It will be appreciated that the composite film 200 may have a VLT within a range between, an including, any of the minimum and maximum values noted above. It will be further appreciated that the composite film 200 have a VLT of any value between, and including, any of the minimum and maximum values noted above.

According to still other embodiments, the composite film 200 may have a particular haze value. For example, the composite film 200 may have a haze value of not greater than about 3%, such as, not greater than about 2.9% or not greater than about 2.8% or not greater than about 2.7% or not greater than about 2.6% or not greater than about 2.5% or not greater than about 2.4% or not greater than about 2.3% or not greater than about 2.2% or not greater than about 2.1% or not greater than about 2.0% or not greater than about 1.9% or not greater than about 1.8% or not greater than about 1.7% or not greater than about 1.6% or not greater than about 1.5% or not greater than about 1.4% or even not greater than about 1.3%. It will be appreciated that the composite film 200 may have a haze value within a range between, an including, any of the values noted above. It will be further appreciated that the composite film 200 have a VLT of any value between, and including, any of the values noted above.

According to yet other embodiments, the composite film 200 may have a particular reflectance. For example, the composite film 200 may have a reflectance of not greater than about 7.0%, such as, not greater than about 6.9% or not greater than about 6.8% or not greater than about 6.7% or not greater than about 6.6% or not greater than about 6.5% or not greater than about 6.4% or not greater than about 6.3% or not greater than about 6.2% or not greater than about 6.1% or not greater than about 6.0% or not greater than about 5.9% or not greater than about 5.8% or not greater than about 5.7% or not greater than about 5.6% or not greater than about 5.5% or not greater than about 5.4% or not greater than about 5.3% or not greater than about 5.2% or not greater than about 5.1% or not greater than about 5.0%. It will be appreciated that the composite film 200 may have a reflectance within a range between, an including, any of the minimum and maximum values noted above. It will be further appreciated that the composite film 200 may have a reflectance of any value between, and including, any of the minimum and maximum values noted above.

According to still other embodiments, the second anti-reflective coating 230 may have a particular thickness. For example, the second anti-reflective coating 230 may have a thickness of at least about 50 nm, such as, at least about 60 nm or at least about 70 nm or at least about 80 nm or at least about 90 nm or at least about 100 nm or at least about 110 nm or at least about 120 nm or at least about 130 nm or at least about 140 nm or at least about 150 nm or at least about 160 nm or at least about 170 nm or at least about 180 nm or at least about 190 nm or even at least about 200 nm. According to still other embodiments, the anti-reflective coating 120 may have a thickness of not greater than about 500 nm, such as, not greater than about 490 nm or not greater than about 480 nm or not greater than about 470 nm or not greater than about 460 nm or not greater than about 450 nm or not greater than about 440 nm or not greater than about 430 nm or not greater than about 420 nm or not greater than about 410 nm or not greater than about 400 nm or not greater than about 390 nm or not greater than about 380 nm or not greater than about 370 nm or not greater than about 360 nm or not greater than about 350 nm or not greater than about 340 nm or not greater than about 330 nm or not greater than about 320 nm or not greater than about 310 nm or even not greater than about 300 nm. It will be appreciated that the second anti-reflective coating 230 may have a thickness within a range between, an including, any of the minimum and maximum values noted above. It will be further appreciated that the second anti-reflective coating 230 may have a thickness of any value between, and including, any of the minimum and maximum values noted above.

According to still other embodiments, the second anti-reflective coating 230 may have a particular ratio $AC2_{SiO2}/AC2_B$, where $AC2_{SiO2}$ is the concentration of the silica nanoparticles in the second anti-reflective coating 230 in weight percent for a total weight of the second anti-reflective coating 230 and $AC2_B$ is the concentration of the first UV curable acrylate binder in the second anti-reflective coating 230 in weight percent for a total weight of the second anti-reflective coating 230. For example, the second anti-reflective coating 230 may have a ratio $AC2_{SiO2}/AC2_B$ of at least about 0.01, such as, at least about 0.05 or at least about 0.07 or at least about 0.1 or at least about 0.12 or at least about 0.15 or at least about 0.17 or at least about 0.20 or at least about 0.22 or at least about 0.25 or at least about 0.27 or even at least about 0.30. According to still other embodiments, the second anti-reflective coating 230 may have a ratio $AC2_{SiO2}/AC2_B$ of not greater than about 1.3, such as, not greater than about 1.2 or not greater than about 1.1 or not greater than about 1.0 or not greater than about 0.9 or not greater than about 0.8 or not greater than about 0.7 or not greater than about 0.6 or even not greater than about 0.5. It will be appreciated that the second anti-reflective coating 230 may have a ratio $AC2_{SiO2}/AC2_B$ within a range between, an including, any of the minimum and maximum values noted above. It will be further appreciated that the second anti-reflective coating 230 may have a ratio $AC2_{SiO2}/AC2_B$ of any value between, and including, any of the minimum and maximum values noted above.

According to yet other embodiments, the second anti-reflective coating 230 may include a first UV curable acrylate binder. According to still other embodiments, the first UV curable acrylate binder in the second anti-reflective coating 230 may be SR351LV, SR355, SR399, tetrafunctional acrylate monomer, pentafunctional acrylate monomers, pentaerythritol Tri-Tetraacrylate (PETIA), Ebecry 140, Ebecryl 180, multifunctional oligomers, or UV resins.

According to still other embodiments, the second anti-reflective coating 230 may include a particular concentration of the first UV curable acrylate binder. For example, the second anti-reflective coating 230 may have a first UV curable acrylate binder concentration of at least about 40 wt. % for a total weight of the first anti-reflective coating, such as, at least about 42 wt. % or at least about 44 wt. % or at least about 46 wt. % or at least about 48 wt. % or at least about 50 wt. % or at least about 52 wt. % or at least about 54 wt. % or at least about 56 wt. % or at least about 58 wt. % or even at least about 60 wt. %. According to yet other embodiments, the second anti-reflective coating 230 may have a first UV curable acrylate binder concentration of not greater than about 95 wt. % for a total weight of the first anti-reflective coating, such as, not greater than about 93 wt. % or not greater than about 90 wt. % or not greater than about 88 wt. % or not greater than about 85 wt. % or not greater than about 83 wt. % or not greater than about 80 wt. % or not greater than about 78 wt. % or not greater than about 75 wt. % or not greater than about 73 wt. % or even not greater than about 70 wt. %. It will be appreciated that the second anti-reflective coating 230 may have a first UV curable acrylate binder concentration within a range between, an including, any of the minimum and maximum values noted above. It will be further appreciated that the second anti-reflective coating 230 may have a first UV curable acrylate binder concentration of any value between, and including, any of the minimum and maximum values noted above.

According to yet other embodiments, the second anti-reflective coating 230 may include a photo initiator component. According to still other embodiments, the photo initiator component in the second anti-reflective coating 230 may be Omnirad 184, Omnirad 819, Omnirad 1173, CPI 6976, other similar photo initiators, or any combinations of the above.

According to still other embodiments, the second anti-reflective coating 230 may include a particular concentration of the photo initiator component. For example, the second anti-reflective coating 230 may have a photo initiator component concentration of at least about 2 wt. % for a total weight of the first anti-reflective coating, such as, at least about 2.2 wt. % or at least about 2.5 wt. % or at least about 2.7 wt. % or at least about 3.0 wt. % or at least about 3.2 wt. % or at least about 3.5 wt. % or at least about 3.7 wt. % or at least about 4.0 wt. % or at least about 4.2 wt. % or at least about 4.5 wt. % or at least about 4.7 wt. % or at least about 5.0 wt. % or at least about 5.2 wt. % or even at least about 5.5 wt. %. According to yet other embodiments, the second anti-reflective coating 230 may have a photo initiator component concentration of not greater than about 10 wt. % for a total weight of the first anti-reflective coating, such as, not greater than about 9.8 wt. % or not greater than about 9.5 wt. % or not greater than about 9.3 wt. % or not greater than about 9.0 wt. % or not greater than about 8.8 wt. % or not greater than about 8.5 wt. % or not greater than about 8.3 wt. % or not greater than about 8.0 wt. % or not greater than about 7.8 wt. % or not greater than about 7.5 wt. % or not greater than about 7.3 wt. % or not greater than about 7.0 wt. % or not greater than about 6.8 wt. % or even not greater than about 6.5 wt. %. It will be appreciated that the second anti-reflective coating 230 may have a photo initiator component concentration within a range between, an including, any of the minimum and maximum values noted above. It will be further appreciated that the second anti-reflective coating 230 may have a photo initiator component concentration of any value between, and including, any of the minimum and maximum values noted above.

According to still other embodiments, the second anti-reflective coating 230 may include a particular concentration of silica nanoparticles. For example, the second anti-reflective coating 230 may have a silica nanoparticles concentration of at least about 5 wt. % for a total weight of the first anti-reflective coating, such as, at least about 6 wt. % or at least about 7 wt. % or at least about 8 wt. % or at least about 9 wt. % or at least about 10 wt. % or at least about 11 wt. % or at least about 12 wt. % or at least about 13 wt. % or at least about 14 wt. % or at least about 15 wt. % or at least about 16 wt. % or at least about 17 wt. % or at least about 18 wt. % or at least about 19 wt. % or at least about 20 wt. % or at least about 21 wt. % or at least about 22 wt. % or at least about 23 wt. % or at least about 24 wt. % or even at least about 25 wt. %. According to yet other embodiments, the second anti-reflective coating 230 may have a silica nanoparticles concentration of not greater than about 60 wt. % or a total weight of the first anti-reflective coating, such as, not greater than about 58 wt. % or not greater than about 55 wt. % or not greater than about 53 wt. % or not greater than about 50 wt. % or not greater than about 48 wt. % or not greater than about 45 wt. % or not greater than about 43 wt. % or not greater than about 40 wt. % or not greater than about 38 wt. % or not greater than about 35 wt. % or not greater than about 33 wt. % or even not greater than about 30 wt. %. It will be appreciated that the second anti-reflective coating 230 may have a silica nanoparticles concentration within a range between, an including, any of the minimum and maximum values noted above. It will be further appreciated that the second anti-reflective coating 230 may have a silica nanoparticles concentration of any value between, and including, any of the minimum and maximum values noted above.

According to still other embodiments, the silica nanoparticles in the second anti-reflective coating 230 may be surface treated silica nanoparticles. According to other embodiments, the silica nanoparticles in the second anti-reflective coating 230 may be generally solid spherical silica nanoparticles.

According to yet other embodiments, the second anti-reflective coating 230 may be surface treated with polysiloxane, acrylate or a combination thereof.

According to yet other embodiments, the silica nanoparticles in the second anti-reflective coating 230 may have a particular average particle size (D50). For purposes of embodiments described herein, average particle size (D50) is measured according to ASTM E2490. According to certain embodiments, the silica nanoparticles in the second anti-reflective coating 230 may have an average particle size (D50) of at least about 1 nm, such as, at least about 2 nm or at least about 3 nm or at least about 4 nm or at least about 5 nm or at least about 6 nm or at least about 7 nm or at least about 8 nm or at least about 10 nm or at least about 11 nm or at least about 12 nm or at least about 13 nm or at least about 14 nm or at least about 15 nm or at least about 16 nm or at least about 17 nm or even at least about 18 nm. According to other embodiments, the silica nanoparticles in the second anti-reflective coating 230 may have an average particle size (D50) of not greater than about 500 nm, such as, not greater than about 400 nm or not greater than about 300 nm or not greater than about 200 nm or not greater than about 100 nm or not greater than about 95 nm or not greater than about 90 nm or not greater than about 85 nm or not greater than about 80 nm or not greater than about 75 nm or not greater than about 65 nm or not greater than about 60 nm or not greater than about 55 nm or not greater than about 50 nm or not greater than about 45 nm or not greater than about 40 nm or not greater than about 35 nm or not greater than about 30 nm or even not greater than about 25 nm. It will be appreciated that the silica nanoparticles in the second anti-reflective coating 230 may have an average particle size (D50) within a range between, an including, any of the minimum and maximum values noted above. It will be further appreciated that the silica nanoparticles in the second anti-reflective coating 230 may have an average particle size (D50) of any value between, and including, any of the minimum and maximum values noted above.

According to yet other embodiments, the second anti-reflective coating 230 may further include a slip agent. According to still other embodiments, the slip agent may be any known slip agent used in the wet coating industry, for example, Tego glide 410, Tegorad 2100, Tegorad 2300, Tegorad 2500, BYK306, BYK307, and any combination thereof.

According to yet other embodiments, the second anti-reflective coating 230 may include a particular concentration of the slip agent. For example, the second anti-reflective coating 230 may have a slip agent concentration of at least about 0.01 wt. % for a total weight of the first anti-reflective coating or at least about 0.5 wt. % or even at least about 1.0 wt. %. According to still other embodiments, the second anti-reflective coating 230 may have a slip agent concentration of not greater than about 5 wt. % for a total weight of the first anti-reflective coating or not greater than about 4.5 wt. % or not greater than about 4.0 wt. %. It will be appreciated that the second anti-reflective coating 230 may have a slip agent concentration within a range between, an including, any of the minimum and maximum values noted above. It will be further appreciated that the second anti-reflective coating 230 may have a slip agent concentration of any value between, and including, any of the minimum and maximum values noted above.

According to yet other embodiments, the second anti-reflective coating 230 may further include a wetting agent. According to still other embodiments, the wetting agent may be any known wetting agent used in the wet coating industry, for example, BYK-377, BYK-UV 3500, Tego 270, or any combination thereof.

According to yet other embodiments, the second anti-reflective coating 230 may include a particular concentration of the wetting agent. For example, the second anti-reflective coating 230 may have a wetting agent concentration of at least about 0.01 wt. % for a total weight of the first anti-reflective coating or at least about 0.05 wt. % or at least about 0.1 wt. %. According to still other embodiments, the second anti-reflective coating 230 may have a wetting agent concentration of not greater than about 0.3 wt. % for a total weight of the first anti-reflective coating or not greater than about 0.25 wt. % or even not greater than about 0.2 wt. %. It will be appreciated that the second anti-reflective coating 230 may have a slip agent concentration within a range between, an including, any of the minimum and maximum values noted above. It will be further appreciated that the second anti-reflective coating 230 may have a wetting agent concentration of any value between, and including, any of the minimum and maximum values noted above.

According to yet other embodiments, the second anti-reflective coating 230 may further include a surface energy modifier. According to still other embodiments, the surface energy modifier may be any known surface energy modifier used in the wet coating industry, for example, BYK-315, BYK-300, BYK-310, BY-378, or any combination thereof.

According to yet other embodiments, the second anti-reflective coating 230 may include a particular concentration of the surface energy modifier. For example, the second anti-reflective coating 230 may have a surface energy modifier concentration of at least about 0.01 wt. % for a total weight of the first anti-reflective coating or at least about 0.05 wt. % or at least about 0.1 wt. %. According to still other embodiments, the second anti-reflective coating 230 may have a surface energy modifier concentration of not greater than about 0.30 wt. % for a total weight of the first anti-reflective coating or not greater than about 0.25 wt. % or even not greater than about 0.2 wt. %. It will be appreciated that the second anti-reflective coating 230 may have a surface energy modifier concentration within a range between, an including, any of the minimum and maximum values noted above. It will be further appreciated that the second anti-reflective coating 230 may have a surface energy modifier concentration of any value between, and including, any of the minimum and maximum values noted above.

According to yet other embodiments, the second anti-reflective coating 230 may further include a second UV curable acrylate binder. According to still other embodiments, the second UV curable acrylate binder may be SR351LV, SR355, SR399, tetrafunctional acrylate monomer, pentafunctional acrylate monomers, pentaerythritol Tri-Tetraacrylate (PETIA), Ebecry 140, Ebecryl 180, multifunctional oligomers, or UV resins.

According to yet other embodiments, the second anti-reflective coating 230 may include a particular concentration of the second UV curable acrylate binder. For example, the second anti-reflective coating 230 may have a second UV curable acrylate binder concentration of at least about 5.0 wt. % for a total weight of the first anti-reflective coating or at least about 7 wt. % or at least about 10 wt. % or at least about 12 wt. % or at least about 15 wt. % or at least about 17 wt. % or at least about 20 wt. % or at least about 22 wt. % or even at least about 25 wt. %. According to still other embodiments, the second anti-reflective coating 230 may have a second UV curable acrylate binder concentration of not greater than about 60 wt. % for a total weight of the first anti-reflective coating or not greater than about 58 wt. % or not greater than about 55 wt. % or not greater than about 53 wt. % or not greater than about 50 wt. % or not greater than about 48 wt. % or not greater than about 45 wt. % or not greater than about 43 wt. % or not greater than about 40 wt. %. It will be appreciated that the second anti-reflective coating 230 may have a second UV curable acrylate binder concentration within a range between, an including, any of the minimum and maximum values noted above. It will be further appreciated that the second anti-reflective coating 230 may have a second UV curable acrylate binder concentration of any value between, and including, any of the minimum and maximum values noted above.

Figure 3:
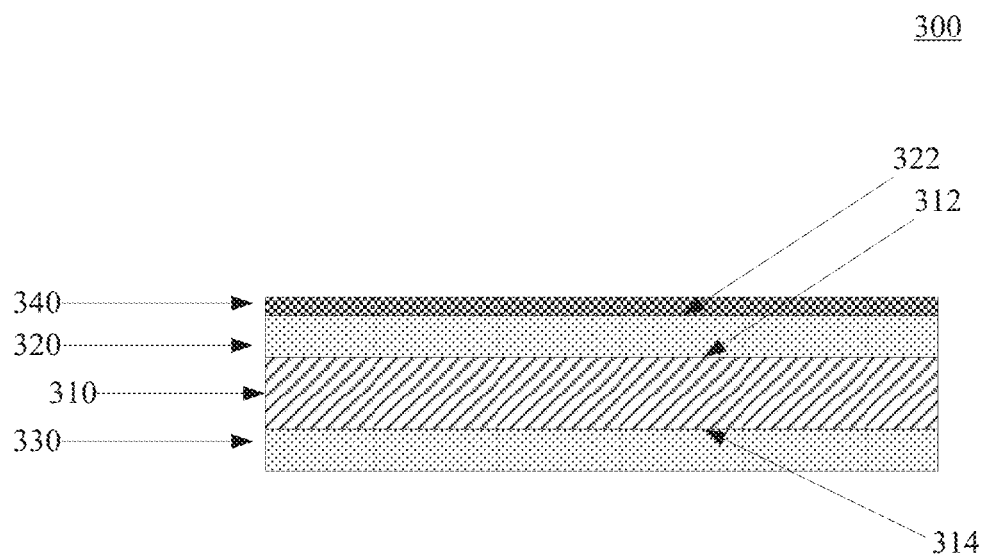
FIG. 3 includes an illustration of another example composite film according to certain embodiments described herein FIG. 4 includes an illustration of another example composite film according to certain embodiments described herein.

FIG. 3 includes an illustration of a cross-sectional view of a portion of another example composite film 300 according to embodiments described herein. As shown in FIG. 3, the composite film 300 may include a first transparent substrate 310, a first anti-reflective coating 320 overlying a first surface 312 of the first transparent substrate 310, a second anti-reflective coating 330 overlying a second surface 314 of the first transparent substrate 310 and a first adhesive layer 340 overlying a surface 322 of the first anti-reflective coating 320.

It will be appreciated that the composite film 300 and all components described in reference to the composite film 300 as shown in FIG. 3 may have any of the characteristics described herein with reference to corresponding components in FIGS. 1 and 2. In particular, the characteristics of the composite film 300, the transparent substrate 310, the first anti-reflective coating 320, and the second anti-reflective coating 330 shown in FIG. 3 may have any of the corresponding characteristics described herein in reference to composite films 200 (100), the transparent substrate 210 (110), the first anti-reflective coating 220 (120) and the second anti-reflective coating 230 shown in FIG. 2 (FIG. 1), respectively.

According to particular embodiments, the composite film 300 may have a particular VLT. For example, the composite film 300 may have a VLT of at least about 93.2%, such as, at least about 93.4% or at least about 93.6% or at least about 93.8% or at least about 94.0% or at least about 94.2% or at least about 94.4% or at least about 94.6% or at least about 94.8% or at least about 95.0% or at least about 95.2% or at least about 95.4% or at least about 95.6% or at least about 95.8% or even at least about 96.0%. According to still other embodiments, the composite film 300 may have a VLT of not greater than about 99.9%. It will be appreciated that the composite film 300 may have a VLT within a range between, an including, any of the minimum and maximum values noted above. It will be further appreciated that the composite film 300 have a VLT of any value between, and including, any of the minimum and maximum values noted above.

According to still other embodiments, the composite film 300 may have a particular haze value. For example, the composite film 300 may have a haze value of not greater than about 3%, such as, not greater than about 2.9% or not greater than about 2.8% or not greater than about 2.7% or not greater than about 2.6% or not greater than about 2.5% or not greater than about 2.4% or not greater than about 2.3% or not greater than about 2.2% or not greater than about 2.1% or not greater than about 2.0% or not greater than about 1.9% or not greater than about 1.8% or not greater than about 1.7% or not greater than about 1.6% or not greater than about 1.5% or not greater than about 1.4% or even not greater than about 1.3%. It will be appreciated that the composite film 300 may have a haze value within a range between, an including, any of the values noted above. It will be further appreciated that the composite film 300 have a VLT of any value between, and including, any of the values noted above.

According to yet other embodiments, the composite film 300 may have a particular reflectance. For example, the composite film 300 may have a reflectance of not greater than about 7.0%, such as, not greater than about 6.9% or not greater than about 6.8% or not greater than about 6.7% or not greater than about 6.6% or not greater than about 6.5% or not greater than about 6.4% or not greater than about 6.3% or not greater than about 6.2% or not greater than about 6.1% or not greater than about 6.0% or not greater than about 5.9% or not greater than about 5.8% or not greater than about 5.7% or not greater than about 5.6% or not greater than about 5.5% or not greater than about 5.4% or not greater than about 5.3% or not greater than about 5.2% or not greater than about 5.1% or not greater than about 5.0%. It will be appreciated that the composite film 300 may have a reflectance within a range between, an including, any of the minimum and maximum values noted above. It will be further appreciated that the composite film 300 may have a reflectance of any value between, and including, any of the minimum and maximum values noted above.

According to still other embodiments, the first adhesive layer 340 may include any known pressure sensitive adhesive for use in the adhesive industry, for example, Aroset 1452, Aroset 1450, Aroset 6428 from Ashland, Duro-Tak 222A, Duro-Tak80-1093 or combinations thereof.

According to still other embodiments, the first adhesive layer 340 may have a particular thickness. For example, the first adhesive layer 340 may have a thickness of at least about 2 μm, such as, at least about 5 μm or at least about 7 μm or at least about 10 μm or at least about 12 μm or at least 15 μm or at least about 17 μm or even at least about 20 μm. According to still other embodiments, the first adhesive layer 340 may have a thickness of not greater than about 50 μm, such as, not greater than about 48 μm or not greater than about 45 μm or not greater than about 43 μm or not greater than about 40 μm or not greater than about 38 μm or not greater than about 35 μm or not greater than about 33 μm or even not greater than about 30 μm. It will be appreciated that the first adhesive layer 340 may have a thickness within a range between, an including, any of the minimum and maximum values noted above. It will be further appreciated that the first adhesive layer 340 may have a thickness of any value between, and including, any of the minimum and maximum values noted above.

According to still other embodiments, the first adhesive layer 340 may include nanoparticles. According to still other embodiments, the nanoparticles in the first adhesive layer 340 may be surface treated silica nanoparticles. According to other embodiments, the silica nanoparticles in the second anti-reflective coating 340 may be generally solid spherical silica nanoparticles.

According to yet other embodiments, the nanoparticles in first adhesive layer 340 may have a particular average particle size (D50). For purposes of embodiments described herein, average particle size (D50) is measured according to ASTM E2490. According to certain embodiments, the nanoparticles in first adhesive layer 340 may have an average particle size (D50) of at least about 1 μm, such as, at least about 2 μm or at least about 3 μm or at least about 4 μm or at least about 5 μm or at least about 6 μm or at least about 7 μm or at least about 8 μm or at least about 10 μm or at least about 11 μm or at least about 12 μm or at least about 13 μm or at least about 14 µm or at least about 15 µm or at least about 16 µm or at least about 17 µm or even at least about 18 µm. According to other embodiments, the nanoparticles in first adhesive layer 340 may have an average particle size (D50) of not greater than about 500 µm, such as, not greater than about 400 µm or not greater than about 300 µm or not greater than about 200 µm or not greater than about 100 µm or not greater than about 95 µm or not greater than about 90 µm or not greater than about 85 µm or not greater than about 80 µm or not greater than about 75 µm or not greater than about 65 µm or not greater than about 60 µm or not greater than about 55 µm or not greater than about 50 µm or not greater than about 45 µm or not greater than about 40 µm or not greater than about 35 µm or not greater than about 30 µm or even not greater than about 25 µm. It will be appreciated that the nanoparticles in first adhesive layer 340 may have an average particle size (D50) within a range between, an including, any of the minimum and maximum values noted above. It will be further appreciated that the nanoparticles in first adhesive layer 340 may have an average particle size (D50) of any value between, and including, any of the minimum and maximum values noted above.

Figure 4:
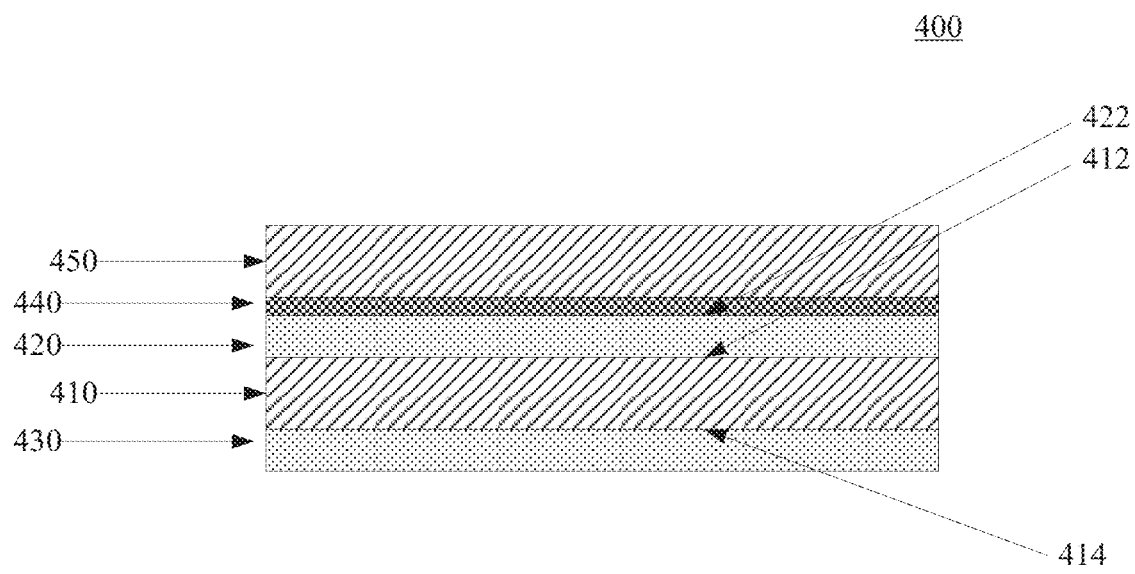

FIG. 4 includes an illustration of a cross-sectional view of a portion of another example composite film 400 according to embodiments described herein. As shown in FIG. 4, the composite film 400 may include a first transparent substrate 410, a first anti-reflective coating 420 overlying a first surface 412 of the first transparent substrate 410, a second anti-reflective coating 430 overlying a second surface 414 of the first transparent substrate 410, a first adhesive layer 440 overlying a surface 422 of the first anti-reflective coating 420 and a second transparent substrate 450 overlying the first adhesive layer 440.

It will be appreciated that the composite film 400 and all components described in reference to the composite film 400 as shown in FIG. 4 may have any of the characteristics described herein with reference to corresponding components in FIGS. 1, 2 and 3. In particular, the characteristics of the composite film 400, the transparent substrate 410, the first anti-reflective coating 420, the second anti-reflective coating 430 and the first adhesive layer 440 shown in FIG. 4 may have any of the corresponding characteristics described herein in reference to composite films 300 (200, 100), the transparent substrate 310 (210, 110), the first anti-reflective coating 320 (220, 120), the second anti-reflective coating 330 (230) and the first adhesive layer 340 shown in FIG. 3 (FIG. 2, FIG. 1), respectively.

According to particular embodiments, the composite film 400 may have a particular VLT. For example, the composite film 400 may have a VLT of at least about 93.2%, such as, at least about 93.4% or at least about 93.6% or at least about 93.8% or at least about 94.0% or at least about 94.2% or at least about 94.4% or at least about 94.6% or at least about 94.8% or at least about 95.0% or at least about 95.2% or at least about 95.4% or at least about 95.6% or at least about 95.8% or even at least about 96.0%. According to still other embodiments, the composite film 400 may have a VLT of not greater than about 99.9%. It will be appreciated that the composite film 400 may have a VLT within a range between, an including, any of the minimum and maximum values noted above. It will be further appreciated that the composite film 400 have a VLT of any value between, and including, any of the minimum and maximum values noted above.

According to still other embodiments, the composite film 400 may have a particular haze value. For example, the composite film 400 may have a haze value of not greater than about 3%, such as, not greater than about 2.9% or not greater than about 2.8% or not greater than about 2.7% or not greater than about 2.6% or not greater than about 2.5% or not greater than about 2.4% or not greater than about 2.3% or not greater than about 2.2% or not greater than about 2.1% or not greater than about 2.0% or not greater than about 1.9% or not greater than about 1.8% or not greater than about 1.7% or not greater than about 1.6% or not greater than about 1.5% or not greater than about 1.4% or even not greater than about 1.3%. It will be appreciated that the composite film 400 may have a haze value within a range between, an including, any of the values noted above. It will be further appreciated that the composite film 400 have a VLT of any value between, and including, any of the values noted above.

According to yet other embodiments, the composite film 400 may have a particular reflectance. For example, the composite film 400 may have a reflectance of not greater than about 7.0%, such as, not greater than about 6.9% or not greater than about 6.8% or not greater than about 6.7% or not greater than about 6.6% or not greater than about 6.5% or not greater than about 6.4% or not greater than about 6.3% or not greater than about 6.2% or not greater than about 6.1% or not greater than about 6.0% or not greater than about 5.9% or not greater than about 5.8% or not greater than about 5.7% or not greater than about 5.6% or not greater than about 5.5% or not greater than about 5.4% or not greater than about 5.3% or not greater than about 5.2% or not greater than about 5.1% or not greater than about 5.0%. It will be appreciated that the composite film 400 may have a reflectance within a range between, an including, any of the minimum and maximum values noted above. It will be further appreciated that the composite film 400 may have a reflectance of any value between, and including, any of the minimum and maximum values noted above.

According to still other embodiments, the second transparent substrate 450 may have a particular thickness. For example, the second transparent substrate 450 may have a thickness of at least about 5 mil, such as, at least about 6 mil or at least about 7 mil or at least about 8 mil or at least about 9 mil or even at least about 10 mil. According to yet other embodiments, the second transparent substrate 450 may have a thickness of not greater than about 15 mil, such as, not greater than about 14 mil or not greater than about 13 mil or not greater than about 12 mil or not greater than about 11 mil. It will be appreciated that the thickness of the second transparent substrate 450 may be within a range between, an including, any of the minimum and maximum values noted above. It will be further appreciated that the thickness of the second transparent substrate 450 may be any value between, and including, any of the minimum and maximum values noted above.

According to yet other embodiments, the second transparent substrate 450 may include a PET film. According to still other embodiments, the second transparent substrate 450 may consist of a PET film. According to other embodiments, the transparent substrate 110 may include an optically clear PET film. According to yet other embodiments, the transparent substrate 110 may consist of an optically clear PET film. According to other embodiments, the transparent substrate 110 may include a single layer optically clear PET film. According to yet other embodiments, the transparent substrate 110 may consist of a single layer optically clear PET film.

According to still other embodiments, the PET film of the second transparent substrate 450 may have a particular thickness. For example, the PET film of the second transparent substrate 450 may have a thickness of at least about 5 mil, such as, at least about 6 mil or at least about 7 mil or at least about 8 mil or at least about 9 mil or even at least about 10 mil. According to yet other embodiments, the PET film of the second transparent substrate 450 may have a thickness of not greater than about 15 mil, such as, not greater than about 14 mil or not greater than about 13 mil or not greater than about 12 mil or not greater than about 11 mil. It will be appreciated that the thickness of the PET film of the second transparent substrate 450 may be within a range between, an including, any of the minimum and maximum values noted above. It will be further appreciated that the thickness of the PET film of the second transparent substrate 450 may be any value between, and including, any of the minimum and maximum values noted above.

Figure 5A:
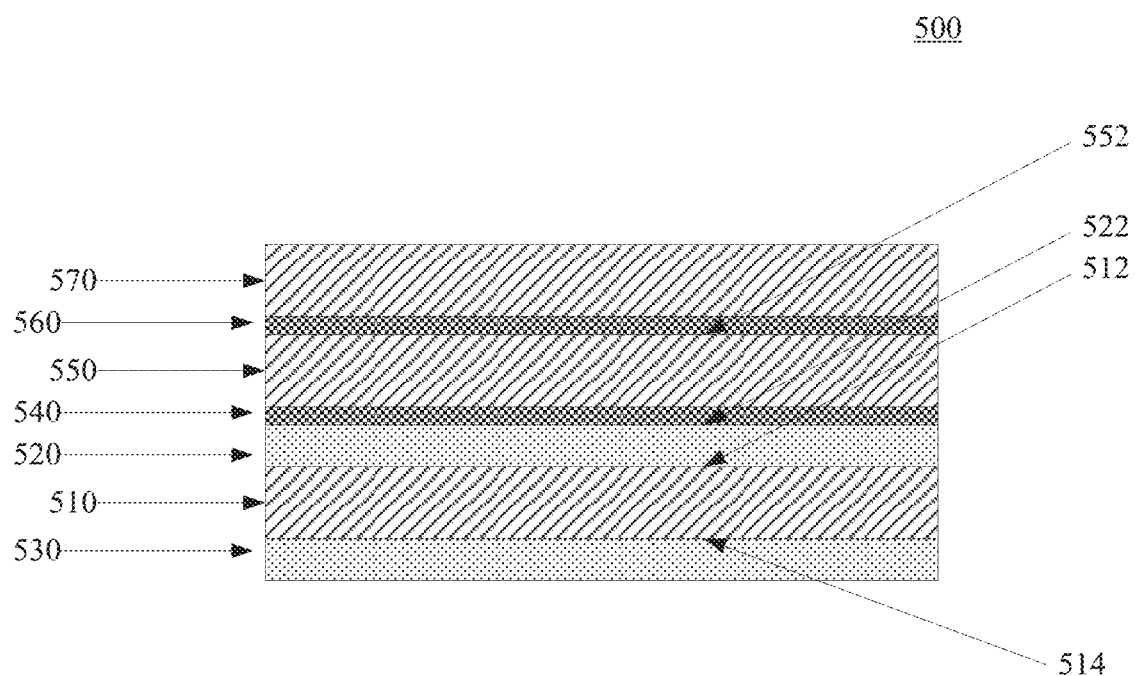
FIG. 5a includes an illustration of another example composite film according to certain embodiments described herein.

FIG. 5a includes an illustration of a cross-sectional view of a portion of another example composite film 500 according to embodiments described herein. As shown in FIG. 5a, the composite film 500 may include a first transparent substrate 510, a first anti-reflective coating 520 overlying a first surface 512 of the first transparent substrate 510, a second anti-reflective coating 530 overlying a second surface 514 of the first transparent substrate 510, a first adhesive layer 540 overlying a surface 522 of the first anti-reflective coating 520, a second transparent substrate 550 overlying the first adhesive layer 540, a second adhesive layer 560 overlying a surface 552 of the second transparent substrate 550, and a third transparent substrate 570 overlying the second adhesive layer 560.

It will be appreciated that the composite film 500 and all components described in reference to the composite film 500 as shown in FIG. 5a may have any of the characteristics described herein with reference to corresponding components in FIGS. 1, 2, 3 and 4. In particular, the characteristics of the composite film 500, the transparent substrate 510, the first anti-reflective coating 520, the second anti-reflective coating 530, the first adhesive layer 540 and the second transparent substrate 550 shown in FIG. 5a may have any of the corresponding characteristics described herein in reference to composite films 400 (300, 200, 100), the transparent substrate 410 (310, 210, 110), the first anti-reflective coating 420 (320, 220, 120), the second anti-reflective coating 430 (330, 230), the first adhesive layer 440 (340) and the second transparent substrate 450 shown in FIG. 4 (FIG. 3, FIG. 2, FIG. 1), respectively.

According to particular embodiments, the composite film 500 may have a particular VLT. For example, the composite film 500 may have a VLT of at least about 93.2%, such as, at least about 93.4% or at least about 93.6% or at least about 93.8% or at least about 94.0% or at least about 94.2% or at least about 94.4% or at least about 94.6% or at least about 94.8% or at least about 95.0% or at least about 95.2% or at least about 95.4% or at least about 95.6% or at least about 95.8% or even at least about 96.0%. According to still other embodiments, the composite film 500 may have a VLT of not greater than about 99.9%. It will be appreciated that the composite film 500 may have a VLT within a range between, an including, any of the minimum and maximum values noted above. It will be further appreciated that the composite film 500 have a VLT of any value between, and including, any of the minimum and maximum values noted above.

According to still other embodiments, the composite film 500 may have a particular haze value. For example, the composite film 500 may have a haze value of not greater than about 3%, such as, not greater than about 2.9% or not greater than about 2.8% or not greater than about 2.7% or not greater than about 2.6% or not greater than about 2.5% or not greater than about 2.4% or not greater than about 2.3% or not greater than about 2.2% or not greater than about 2.1% or not greater than about 2.0% or not greater than about 1.9% or not greater than about 1.8% or not greater than about 1.7% or not greater than about 1.6% or not greater than about 1.5% or not greater than about 1.4% or even not greater than about 1.3%. It will be appreciated that the composite film 500 may have a haze value within a range between, an including, any of the values noted above. It will be further appreciated that the composite film 500 have a haze value of any value between, and including, any of the values noted above.

According to yet other embodiments, the composite film 500 may have a particular reflectance. For example, the composite film 500 may have a reflectance of not greater than about 7.0%, such as, not greater than about 6.9% or not greater than about 6.8% or not greater than about 6.7% or not greater than about 6.6% or not greater than about 6.5% or not greater than about 6.4% or not greater than about 6.3% or not greater than about 6.2% or not greater than about 6.1% or not greater than about 6.0% or not greater than about 5.9% or not greater than about 5.8% or not greater than about 5.7% or not greater than about 5.6% or not greater than about 5.5% or not greater than about 5.4% or not greater than about 5.3% or not greater than about 5.2% or not greater than about 5.1% or not greater than about 5.0%. It will be appreciated that the composite film 500 may have a reflectance within a range between, an including, any of the minimum and maximum values noted above. It will be further appreciated that the composite film 500 may have a reflectance of any value between, and including, any of the minimum and maximum values noted above.

According to still other embodiments, the second adhesive layer 560 may include any known pressure sensitive adhesive for use in the adhesive industry, for example, Aroset 1452, Aroset 1450, Aroset 6428 from Ashland, Duro-Tak 222A, Duro-Tak80-1093 or combinations thereof.

According to still other embodiments, the second adhesive layer 560 may have a particular thickness. For example, the second adhesive layer 560 may have a thickness of at least about 2 μm, such as, at least about 5 μm or at least about 7 μm or at least about 10 μm or at least about 12 μm or at least 15 μm or at least about 17 μm or even at least about 20 μm. According to still other embodiments, the second adhesive layer 560 not greater than about 50 μm, such as, not greater than about 48 μm or not greater than about 45 μm or not greater than about 43 μm or not greater than about 40 μm or not greater than about 38 μm or not greater than about 35 μm or not greater than about 33 μm or even not greater than about 30 μm. It will be appreciated that the second adhesive layer 560 may have a thickness within a range between, an including, any of the minimum and maximum values noted above. It will be further appreciated that the second adhesive layer 560 may have a thickness of any value between, and including, any of the minimum and maximum values noted above.

According to still other embodiments, the second adhesive layer 560 may include nanoparticles. According to still other embodiments, the nanoparticles in the second adhesive layer 560 may be surface treated silica nanoparticles. According to other embodiments, the silica nanoparticles in the second anti-reflective coating 560 may be generally solid spherical silica nanoparticles.

According to yet other embodiments, the nanoparticles in second adhesive layer 560 may have a particular average particle size (D50). For purposes of embodiments described herein, average particle size (D50) is measured according to ASTM E2490. According to certain embodiments, the nanoparticles in second adhesive layer 560 may have an average particle size (D50) of at least about 1 nm, such as, at least about 2 nm or at least about 3 nm or at least about 4 nm or at least about 5 nm or at least about 6 nm or at least about 7 nm or at least about 8 nm or at least about 10 nm or at least about 11 nm or at least about 12 nm or at least about 13 nm or at least about 14 nm or at least about 15 nm or at least about 16 nm or at least about 17 nm or even at least about 18 nm. According to other embodiments, the nanoparticles in second adhesive layer 560 may have an average particle size (D50) of not greater than about 500 nm, such as, not greater than about 400 nm or not greater than about 300 nm or not greater than about 200 nm or not greater than about 100 nm or not greater than about 95 nm or not greater than about 90 nm or not greater than about 85 nm or not greater than about 80 nm or not greater than about 75 nm or not greater than about 65 nm or not greater than about 60 nm or not greater than about 55 nm or not greater than about 50 nm or not greater than about 45 nm or not greater than about 40 nm or not greater than about 35 nm or not greater than about 30 nm or even not greater than about 25 nm. It will be appreciated that the nanoparticles in second adhesive layer 560 may have an average particle size (D50) within a range between, an including, any of the minimum and maximum values noted above. It will be further appreciated that the nanoparticles in second adhesive layer 560 may have an average particle size (D50) of any value between, and including, any of the minimum and maximum values noted above.

According to still other embodiments, the third transparent substrate 570 may have a particular thickness. For example, the third transparent substrate 570 may have a thickness of at least about 5 mil, such as, at least about 6 mil or at least about 7 mil or at least about 8 mil or at least about 9 mil or even at least about 10 mil. According to yet other embodiments, the third transparent substrate 570 may have a thickness of not greater than about 15 mil, such as, not greater than about 14 mil or not greater than about 13 mil or not greater than about 12 mil or not greater than about 11 mil. It will be appreciated that the thickness of the third transparent substrate 570 may be within a range between, an including, any of the minimum and maximum values noted above. It will be further appreciated that the thickness of the third transparent substrate 570 may be any value between, and including, any of the minimum and maximum values noted above.

According to yet other embodiments, the third transparent substrate 570 may include a PET film. According to still other embodiments, the third transparent substrate 570 may consist of a PET film. According to other embodiments, the transparent substrate 110 may include an optically clear PET film. According to yet other embodiments, the transparent substrate 110 may consist of an optically clear PET film. According to other embodiments, the transparent substrate 110 may include a single layer optically clear PET film. According to yet other embodiments, the transparent substrate 110 may consist of a single layer optically clear PET film.

According to still other embodiments, the PET film of the third transparent substrate 570 may have a particular thickness. For example, the PET film of the third transparent substrate 570 may have a thickness of at least about 5 mil, such as, at least about 6 mil or at least about 7 mil or at least about 8 mil or at least about 9 mil or even at least about 10 mil. According to yet other embodiments, the PET film of the third transparent substrate 570 may have a thickness of not greater than about 15 mil, such as, not greater than about 14 mil or not greater than about 13 mil or not greater than about 12 mil or not greater than about 11 mil. It will be appreciated that the thickness of the PET film of the third transparent substrate 570 may be within a range between, an including, any of the minimum and maximum values noted above. It will be further appreciated that the thickness of the PET film of the third transparent substrate 570 may be any value between, and including, any of the minimum and maximum values noted above.

Figure 5B:
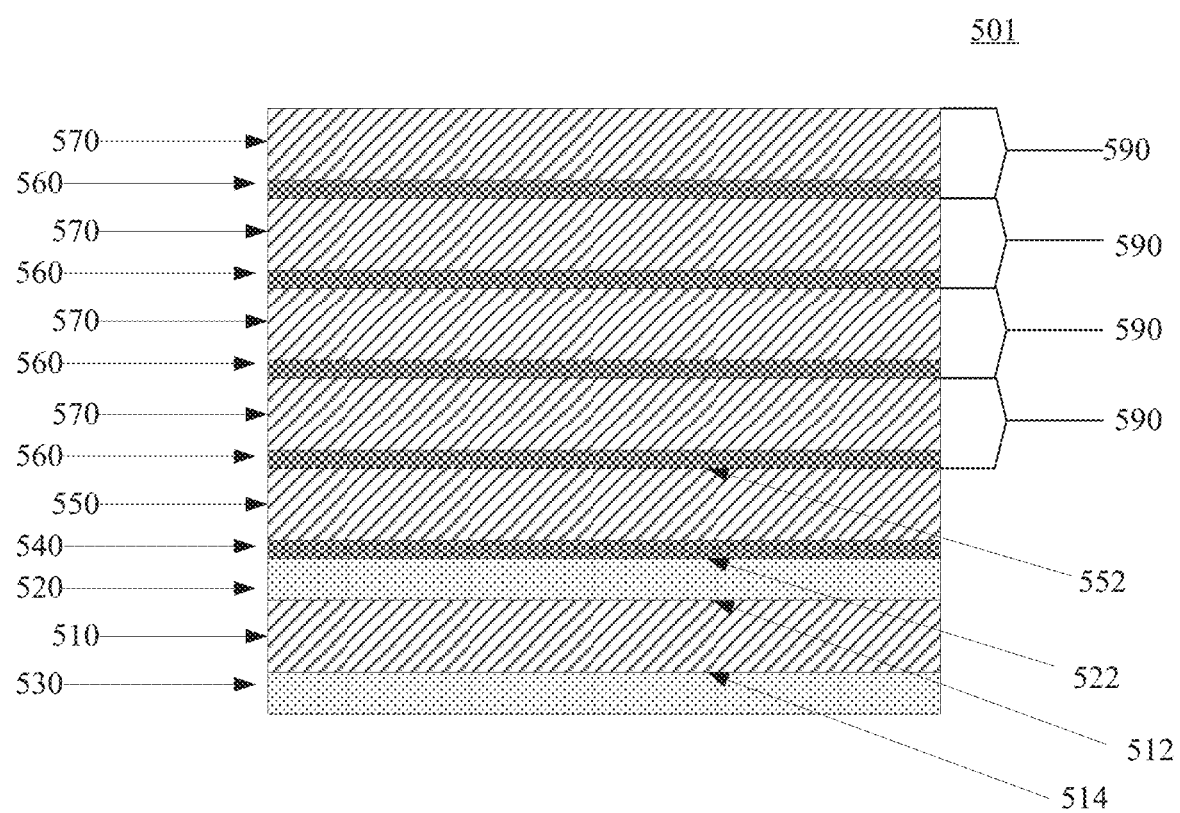
FIG. 5b includes an illustration of another example composite film according to certain embodiments described herein.

FIG. 5b includes an illustration of a cross-sectional view of a portion of another example composite film 501 according to embodiments described herein. As shown in FIG. 5a, the composite film 500 may include a first transparent substrate 510, a first anti-reflective coating 520 overlying a first surface 512 of the first transparent substrate 510, a second anti-reflective coating 530 overlying a second surface 514 of the first transparent substrate 510, a first adhesive layer 540 overlying a surface 522 of the first anti-reflective coating 520, a second transparent substrate 550 overlying the first adhesive layer 540, and four repeating top transparent substrate components 590, which each include a third transparent substrate 570 overlying a second adhesive layer 560.

It will be appreciated that the number of repeating top transparent substrate components 590 shown in FIG. 5b is illustrative and not intended to be limiting. According to particular embodiments, a composite film 501 according to embodiments described herein may include a particular number of repeating top layer components, such as, at least 3 repeating top transparent substrate components 590 or at least 4 repeating top transparent substrate components 590 or at least 5 repeating top transparent substrate components 590 or at least 6 repeating top transparent substrate components 590 or at least 7 repeating top transparent substrate components 590 or at least 8 repeating top transparent substrate components 590 or at least 9 repeating top transparent substrate components 590 or at least 10 repeating top transparent substrate components 590.

According to particular embodiments, the composite film 501 may have a particular VLT. For example, the composite film 501 may have a VLT of at least about 93.2%, such as, at least about 93.4% or at least about 93.6% or at least about 93.8% or at least about 94.0% or at least about 94.2% or at least about 94.4% or at least about 94.6% or at least about 94.8% or at least about 95.0% or at least about 95.2% or at least about 95.4% or at least about 95.6% or at least about 95.8% or even at least about 96.0%. According to still other embodiments, the composite film 501 may have a VLT of not greater than about 99.9%. It will be appreciated that the composite film 501 may have a VLT within a range between, an including, any of the minimum and maximum values noted above. It will be further appreciated that the composite film 501 have a VLT of any value between, and including, any of the minimum and maximum values noted above.

According to still other embodiments, the composite film 501 may have a particular haze value. For example, the composite film 501 may have a haze value of not greater than about 3%, such as, not greater than about 2.9% or not greater than about 2.8% or not greater than about 2.7% or not greater than about 2.6% or not greater than about 2.5% or not greater than about 2.4% or not greater than about 2.3% or not greater than about 2.2% or not greater than about 2.1% or not greater than about 2.0% or not greater than about 1.9% or not greater than about 1.8% or not greater than about 1.7% or not greater than about 1.6% or not greater than about 1.5% or not greater than about 1.4% or even not greater than about 1.3%. It will be appreciated that the composite film 501 may have a haze value within a range between, an including, any of the values noted above. It will be further appreciated that the composite film 501 may have a haze value of any value between, and including, any of the values noted above.

According to yet other embodiments, the composite film 501 may have a particular reflectance. For example, the composite film 501 may have a reflectance of not greater than about 7.0%, such as, not greater than about 6.9% or not greater than about 6.8% or not greater than about 6.7% or not greater than about 6.6% or not greater than about 6.5% or not greater than about 6.4% or not greater than about 6.3% or not greater than about 6.2% or not greater than about 6.1% or not greater than about 6.0% or not greater than about 5.9% or not greater than about 5.8% or not greater than about 5.7% or not greater than about 5.6% or not greater than about 5.5% or not greater than about 5.4% or not greater than about 5.3% or not greater than about 5.2% or not greater than about 5.1% or not greater than about 5.0%. It will be appreciated that the composite film 501 may have a reflectance within a range between, an including, any of the minimum and maximum values noted above. It will be further appreciated that the composite film 501 may have a reflectance of any value between, and including, any of the minimum and maximum values noted above.

Figure 6A:
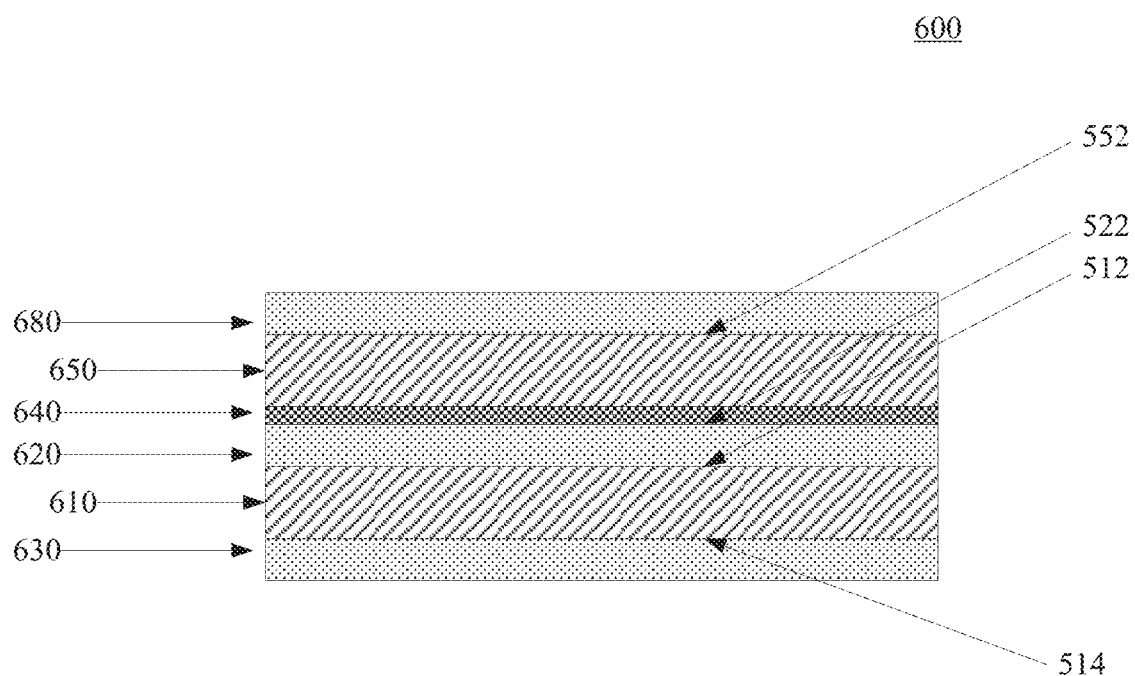
FIG. 6a includes an illustration of another example composite film according to certain embodiments described herein.

FIG. 6a includes an illustration of a cross-sectional view of a portion of another example composite film 600 according to embodiments described herein. As shown in FIG. 6a, the composite film 600 may include a first transparent substrate 610, a first anti-reflective coating 620 overlying a first surface 612 of the first transparent substrate 610, a second anti-reflective coating 630 overlying a second surface 614 of the first transparent substrate 610, a first adhesive layer 640 overlying a surface 622 of the first anti-reflective coating 620, a second transparent substrate 650 overlying the first adhesive layer 640, and a third anti-reflective coating 680 overlying a surface 652 of the second transparent substrate 650.

It will be appreciated that the composite film 600 and all components described in reference to the composite film 600 as shown in FIG. 6a may have any of the characteristics described herein with reference to corresponding components in FIGS. 1, 2, 3, 4, 5a and 5b. In particular, the characteristics of the composite film 600, the transparent substrate 610, the first anti-reflective coating 620, the second anti-reflective coating 630, the first adhesive layer 640 and the second transparent substrate 650 shown in FIG. 6a may have any of the corresponding characteristics described herein in reference to composite films 500 (400, 300, 200, 100), the transparent substrate 510 (410, 310, 210, 110), the first anti-reflective coating 520 (420, 320, 220, 120), the second anti-reflective coating 530 (430, 330, 230), the first adhesive layer 540 (440, 340) and the second transparent substrate 550 (450) shown in FIG. 5a or 5b (FIG. 4, FIG. 3, FIG. 2, FIG. 1), respectively.

According to still other embodiments, the third anti-reflective coating 680 may have a particular thickness. For example, the third anti-reflective coating 680 may have a thickness of at least about 50 nm, such as, at least about 60 nm or at least about 70 nm or at least about 80 nm or at least about 90 nm or at least about 100 nm or at least about 110 nm or at least about 120 nm or at least about 130 nm or at least about 140 nm or at least about 150 nm or at least about 160 nm or at least about 170 nm or at least about 180 nm or at least about 190 nm or even at least about 200 nm. According to still other embodiments, the anti-reflective coating 120 may have a thickness of not greater than about 500 nm, such as, not greater than about 490 nm or not greater than about 480 nm or not greater than about 470 nm or not greater than about 460 nm or not greater than about 450 nm or not greater than about 440 nm or not greater than about 430 nm or not greater than about 420 nm or not greater than about 410 nm or not greater than about 400 nm or not greater than about 390 nm or not greater than about 380 nm or not greater than about 370 nm or not greater than about 360 nm or not greater than about 350 nm or not greater than about 340 nm or not greater than about 330 nm or not greater than about 320 nm or not greater than about 310 nm or even not greater than about 300 nm. It will be appreciated that the third anti-reflective coating 680 may have a thickness within a range between, an including, any of the minimum and maximum values noted above. It will be further appreciated that the third anti-reflective coating 680 may have a thickness of any value between, and including, any of the minimum and maximum values noted above.

According to still other embodiments, the third anti-reflective coating 680 may have a particular ratio $AC3_{SiO2}/AC3_B$, where $AC3_{SiO2}$ is the concentration of the silica nanoparticles in the third anti-reflective coating 680 in weight percent for a total weight of the third anti-reflective coating 680 and $AC3_B$ is the concentration of the first UV curable acrylate binder in the third anti-reflective coating 680 in weight percent for a total weight of the third anti-reflective coating 680. For example, the third anti-reflective coating 680 may have a ratio $AC3_{SiO2}/AC3_B$ of at least about 0.01, such as, at least about 0.05 or at least about 0.07 or at least about 0.1 or at least about 0.12 or at least about 0.15 or at least about 0.17 or at least about 0.20 or at least about 0.22 or at least about 0.25 or at least about 0.27 or even at least about 0.30. According to still other embodiments, the third anti-reflective coating 680 may have a ratio $AC3_{SiO2}/AC3_B$ of not greater than about 1.3, such as, not greater than about 1.2 or not greater than about 1.1 or not greater than about 1.0 or not greater than about 0.9 or not greater than about 0.8 or not greater than about 0.7 or not greater than about 0.6 or even not greater than about 0.5. It will be appreciated that the third anti-reflective coating 680 may have a ratio $AC3_{SiO2}/AC3_B$ within a range between, an including, any of the minimum and maximum values noted above. It will be further appreciated that the third anti-reflective coating 680 may have a ratio $AC3_{SiO2}/AC3_B$ of any value between, and including, any of the minimum and maximum values noted above.

According to yet other embodiments, the third anti-reflective coating 680 may include a first UV curable acrylate binder. According to still other embodiments, the first UV curable acrylate binder in the third anti-reflective coating 680 may be SR351LV, SR355, SR399, tetrafunctional acrylate monomer, pentafunctional acrylate monomers, pentaerythritol Tri-Tetraacrylate (PETIA), Ebecry 140, Ebecryl 180, multifunctional oligomers, or UV resins.

According to still other embodiments, the third anti-reflective coating 680 may include a particular concentration of the first UV curable acrylate binder. For example, the third anti-reflective coating 680 may have a first UV curable acrylate binder concentration of at least about 40 wt. % for a total weight of the first anti-reflective coating, such as, at least about 42 wt. % or at least about 44 wt. % or at least about 46 wt. % or at least about 48 wt. % or at least about 50 wt. % or at least about 52 wt. % or at least about 54 wt. % or at least about 56 wt. % or at least about 58 wt. % or even at least about 60 wt. %. According to yet other embodiments, the third anti-reflective coating 680 may have a first UV curable acrylate binder concentration of not greater than about 95 wt. % for a total weight of the first anti-reflective coating, such as, not greater than about 93 wt. % or not greater than about 90 wt. % or not greater than about 88 wt. % or not greater than about 85 wt. % or not greater than about 83 wt. % or not greater than about 80 wt. % or not greater than about 78 wt. % or not greater than about 75 wt. % or not greater than about 73 wt. % or even not greater than about 70 wt. %. It will be appreciated that the third anti-reflective coating 680 may have a first UV curable acrylate binder concentration within a range between, an including, any of the minimum and maximum values noted above. It will be further appreciated that the third anti-reflective coating 680 may have a first UV curable acrylate binder concentration of any value between, and including, any of the minimum and maximum values noted above.

According to yet other embodiments, the third anti-reflective coating 680 may include a photo initiator component. According to still other embodiments, the photo initiator component in the third anti-reflective coating 680 may be Omnirad 184, Omnirad 819, Omnirad 1173, CPI 6976, other similar photo initiators, or any combinations of the above.

According to still other embodiments, the third anti-reflective coating 680 may include a particular concentration of the photo initiator component. For example, the third anti-reflective coating 680 may have a photo initiator component concentration of at least about 2 wt. % for a total weight of the first anti-reflective coating, such as, at least about 2.2 wt. % or at least about 2.5 wt. % or at least about 2.7 wt. % or at least about 3.0 wt. % or at least about 3.2 wt. % or at least about 3.5 wt. % or at least about 3.7 wt. % or at least about 4.0 wt. % or at least about 4.2 wt. % or at least about 4.5 wt. % or at least about 4.7 wt. % or at least about 5.0 wt. % or at least about 5.2 wt. % or even at least about 5.5 wt. %. According to yet other embodiments, the third anti-reflective coating 680 may have a photo initiator component concentration of not greater than about 10 wt. % for a total weight of the first anti-reflective coating, such as, not greater than about 9.8 wt. % or not greater than about 9.5 wt. % or not greater than about 9.3 wt. % or not greater than about 9.0 wt. % or not greater than about 8.8 wt. % or not greater than about 8.5 wt. % or not greater than about 8.3 wt. % or not greater than about 8.0 wt. % or not greater than about 7.8 wt. % or not greater than about 7.5 wt. % or not greater than about 7.3 wt. % or not greater than about 7.0 wt. % or not greater than about 6.8 wt. % or even not greater than about 6.5 wt. %. It will be appreciated that the third anti-reflective coating 680 may have a photo initiator component concentration within a range between, an including, any of the minimum and maximum values noted above. It will be further appreciated that the third anti-reflective coating 680 may have a photo initiator component concentration of any value between, and including, any of the minimum and maximum values noted above.

According to still other embodiments, the third anti-reflective coating 680 may include a particular concentration of silica nanoparticles. For example, the third anti-reflective coating 680 may have a silica nanoparticles concentration of at least about 5 wt. % for a total weight of the first anti-reflective coating, such as, at least about 6 wt. % or at least about 7 wt. % or at least about 8 wt. % or at least about 9 wt. % or at least about 10 wt. % or at least about 11 wt. % or at least about 12 wt. % or at least about 13 wt. % or at least about 14 wt. % or at least about 15 wt. % or at least about 16 wt. % or at least about 17 wt. % or at least about 18 wt. % or at least about 19 wt. % or at least about 20 wt. % or at least about 21 wt. % or at least about 22 wt. % or at least about 23 wt. % or at least about 24 wt. % or even at least about 25 wt. %. According to yet other embodiments, the third anti-reflective coating 680 may have a silica nanoparticles concentration of not greater than about 60 wt. % or a total weight of the first anti-reflective coating, such as, not greater than about 58 wt. % or not greater than about 55 wt. % or not greater than about 53 wt. % or not greater than about 50 wt. % or not greater than about 48 wt. % or not greater than about 45 wt. % or not greater than about 43 wt. % or not greater than about 40 wt. % or not greater than about 38 wt. % or not greater than about 35 wt. % or not greater than about 33 wt. % or even not greater than about 30 wt. %. It will be appreciated that the third anti-reflective coating 680 may have a silica nanoparticles concentration within a range between, an including, any of the minimum and maximum values noted above. It will be further appreciated that the third anti-reflective coating 680 may have a silica nanoparticles concentration of any value between, and including, any of the minimum and maximum values noted above.

According to still other embodiments, the silica nanoparticles in the third anti-reflective coating 680 may be surface treated silica nanoparticles. According to other embodiments, the silica nanoparticles in the third anti-reflective coating 680 may be generally solid spherical silica nanoparticles.

According to yet other embodiments, the third anti-reflective coating 680 may be surface treated with polysiloxane, acrylate or a combination thereof.

According to yet other embodiments, the silica nanoparticles in the third anti-reflective coating 680 may have a particular average particle size (D50). For purposes of embodiments described herein, average particle size (D50) is measured according to ASTM E2490. According to certain embodiments, the silica nanoparticles in the third anti-reflective coating 680 may have an average particle size (D50) of at least about 1 nm, such as, at least about 2 nm or at least about 3 nm or at least about 4 nm or at least about 5 nm or at least about 6 nm or at least about 7 nm or at least about 8 nm or at least about 10 nm or at least about 11 nm or at least about 12 nm or at least about 13 nm or at least about 14 nm or at least about 15 nm or at least about 16 nm or at least about 17 nm or even at least about 18 nm. According to other embodiments, the silica nanoparticles in the third anti-reflective coating 680 may have an average particle size (D50) of not greater than about 500 nm, such as, not greater than about 400 nm or not greater than about 300 nm or not greater than about 200 nm or not greater than about 100 nm or not greater than about 95 nm or not greater than about 90 nm or not greater than about 85 nm or not greater than about 80 nm or not greater than about 75 nm or not greater than about 65 nm or not greater than about 60 nm or not greater than about 55 nm or not greater than about 50 nm or not greater than about 45 nm or not greater than about 40 nm or not greater than about 35 nm or not greater than about 30 nm or even not greater than about 25 nm. It will be appreciated that the silica nanoparticles in the third anti-reflective coating 680 may have an average particle size (D50) within a range between, an including, any of the minimum and maximum values noted above. It will be further appreciated that the silica nanoparticles in the third anti-reflective coating 680 may have an average particle size (D50) of any value between, and including, any of the minimum and maximum values noted above.

According to yet other embodiments, the third anti-reflective coating 680 may further include a slip agent. According to still other embodiments, the slip agent may be any known slip agent used in the wet coating industry, for example, Tego glide 410, Tegorad 2100, Tegorad 2300, Tegorad 2500, BYK306, BYK307, and any combination thereof.

According to yet other embodiments, the third anti-reflective coating 680 may include a particular concentration of the slip agent. For example, the third anti-reflective coating 680 may have a slip agent concentration of at least about 0.1 wt. % for a total weight of the first anti-reflective coating or at least about 0.5 wt. % or even at least about 1.0 wt. %. According to still other embodiments, the third anti-reflective coating 680 may have a slip agent concentration of not greater than about 5 wt. % for a total weight of the first anti-reflective coating or not greater than about 4.5 wt. % or not greater than about 4.0 wt. %. It will be appreciated that the third anti-reflective coating 680 may have a slip agent concentration within a range between, an including, any of the minimum and maximum values noted above. It will be further appreciated that the third anti-reflective coating 680 may have a slip agent concentration of any value between, and including, any of the minimum and maximum values noted above.

According to yet other embodiments, the third anti-reflective coating 680 may further include a wetting agent. According to still other embodiments, the wetting agent may be any known wetting agent used in the wet coating industry, for example, BYK-377, BYK-UV 3500, Tego 270, or any combination thereof.

According to yet other embodiments, the third anti-reflective coating 680 may include a particular concentration of the wetting agent. For example, the third anti-reflective coating 680 may have a wetting agent concentration of at least about 0.01 wt. % for a total weight of the first anti-reflective coating or at least about 0.05 wt. % or at least about 0.1 wt. %. According to still other embodiments, the third anti-reflective coating 680 may have a wetting agent concentration of not greater than about 0.3 wt. % for a total weight of the first anti-reflective coating or not greater than about 0.25 wt. % or even not greater than about 0.2 wt. %. It will be appreciated that the third anti-reflective coating 680 may have a slip agent concentration within a range between, an including, any of the minimum and maximum values noted above. It will be further appreciated that the third anti-reflective coating 680 may have a wetting agent concentration of any value between, and including, any of the minimum and maximum values noted above.

According to yet other embodiments, the third anti-reflective coating 680 may further include a surface energy modifier. According to still other embodiments, the surface energy modifier may be any known surface energy modifier used in the wet coating industry, for example, BYK-315, BYK-300, BYK-310, BY-378, or any combination thereof.

According to yet other embodiments, the third anti-reflective coating 680 may include a particular concentration of the surface energy modifier. For example, the third anti-reflective coating 680 may have a surface energy modifier concentration of at least about 0.01 wt. % for a total weight of the first anti-reflective coating or at least about 0.05 wt. % or at least about 0.1 wt. %. According to still other embodiments, the third anti-reflective coating 680 may have a surface energy modifier concentration of not greater than about 0.30 wt. % for a total weight of the first anti-reflective coating or not greater than about 0.25 wt. % or even not greater than about 0.2 wt. %. It will be appreciated that the third anti-reflective coating 680 may have a surface energy modifier concentration within a range between, an including, any of the minimum and maximum values noted above. It will be further appreciated that the third anti-reflective coating 680 may have a surface energy modifier concentration of any value between, and including, any of the minimum and maximum values noted above.

According to yet other embodiments, the third anti-reflective coating 680 may further include a second UV curable acrylate binder. According to still other embodiments, the third UV curable acrylate binder may be SR351LV, SR355, SR399, tetrafunctional acrylate monomer, pentafunctional acrylate monomers, pentaerythritol Tri-Tetraacrylate (PETIA), Ebecry 140, Ebecryl 180, multifunctional oligomers, or UV resins.

According to yet other embodiments, the third anti-reflective coating 680 may include a particular concentration of the second UV curable acrylate binder. For example, the third anti-reflective coating 680 may have a second UV curable acrylate binder concentration of at least about 5.0 wt. % for a total weight of the first anti-reflective coating or at least about 7 wt. % or at least about 10 wt. % or at least about 12 wt. % or at least about 15 wt. % or at least about 17 wt. % or at least about 20 wt. % or at least about 22 wt. % or even at least about 25 wt. %. According to still other embodiments, the third anti-reflective coating 680 may have a second UV curable acrylate binder concentration of not greater than about 60 wt. % for a total weight of the first anti-reflective coating or not greater than about 58 wt. % or not greater than about 55 wt. % or not greater than about 53 wt. % or not greater than about 50 wt. % or not greater than about 48 wt. % or not greater than about 45 wt. % or not greater than about 43 wt. % or not greater than about 40 wt. %. It will be appreciated that the third anti-reflective coating 680 may have a second UV curable acrylate binder concentration within a range between, an including, any of the minimum and maximum values noted above. It will be further appreciated that the third anti-reflective coating 680 may have a second UV curable acrylate binder concentration of any value between, and including, any of the minimum and maximum values noted above.

Figure 6B:
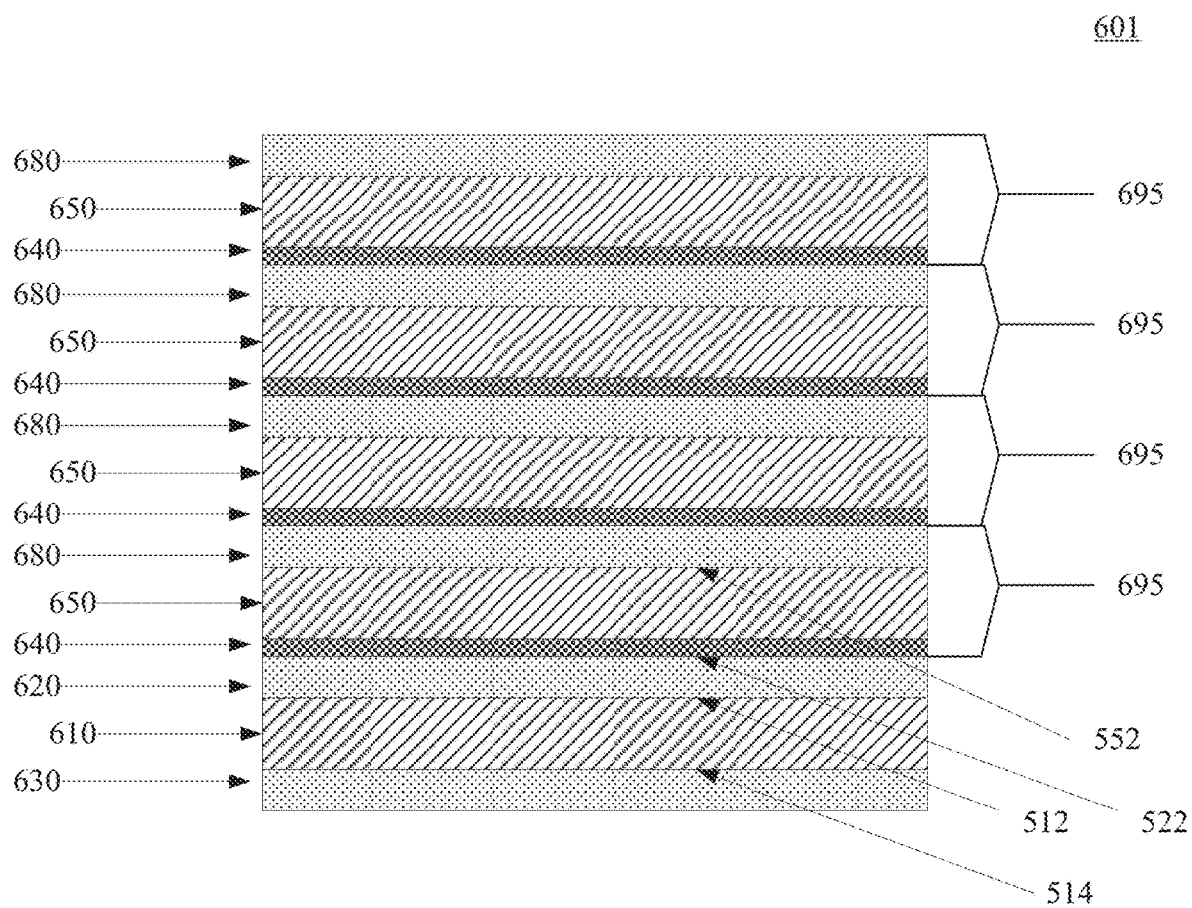
FIG. 6b includes an illustration of another example composite film according to certain embodiments described herein.

FIG. 6b includes an illustration of a cross-sectional view of a portion of another example composite film 601 according to embodiments described herein. As shown in FIG. 6b, the composite film 601 may include a first transparent substrate 610, a first anti-reflective coating 620 overlying a first surface 612 of the first transparent substrate 610, a second anti-reflective coating 630 overlying a second surface 614 of the first transparent substrate 610, and four repeating top anti-reflective components 695 overlying a surface 622 of the first anti-reflective coating 620. Each repeating top anti-reflective components 695 may include a first adhesive layer 640, a second transparent substrate 650 overlying the first adhesive layer 640 and a third anti-reflective coating 680 overlying the second transparent substrate 650.

It will be appreciated that the number of repeating top anti-reflective components 695 shown in FIG. 6b is illustrative and not intended to be limiting. According to particular embodiments, a composite film 601 according to embodiments described herein may include a particular number of repeating top layer components, such as, at least 3 repeating top anti-reflective components 695 or at least 4 repeating top anti-reflective components 695 or at least 5 repeating top anti-reflective components 695 or at least 6 repeating top anti-reflective components 695 or at least 7 repeating top anti-reflective components 695 or at least 8 repeating top anti-reflective components 695 or at least 9 repeating top anti-reflective components 695 or at least 10 repeating top anti-reflective components 695.

According to particular embodiments, the composite film 601 may have a particular VLT. For example, the composite film 601 may have a VLT of at least about 93.2%, such as, at least about 93.4% or at least about 93.6% or at least about 93.8% or at least about 94.0% or at least about 94.2% or at least about 94.4% or at least about 94.6% or at least about 94.8% or at least about 95.0% or at least about 95.2% or at least about 95.4% or at least about 95.6% or at least about 95.8% or even at least about 96.0%. According to still other embodiments, the composite film 601 may have a VLT of not greater than about 99.9%. It will be appreciated that the composite film 601 may have a VLT within a range between, an including, any of the minimum and maximum values noted above. It will be further appreciated that the composite film 601 may have a VLT of any value between, and including, any of the minimum and maximum values noted above.

According to still other embodiments, the composite film 601 may have a particular haze value. For example, the composite film 601 may have a haze value of not greater than about 3%, such as, not greater than about 2.9% or not greater than about 2.8% or not greater than about 2.7% or not greater than about 2.6% or not greater than about 2.5% or not greater than about 2.4% or not greater than about 2.3% or not greater than about 2.2% or not greater than about 2.1% or not greater than about 2.0% or not greater than about 1.9% or not greater than about 1.8% or not greater than about 1.7% or not greater than about 1.6% or not greater than about 1.5% or not greater than about 1.4% or even not greater than about 1.3%. It will be appreciated that the composite film 601 may have a haze value within a range between, an including, any of the values noted above. It will be further appreciated that the composite film 601 may have a haze value of any value between, and including, any of the values noted above.

According to yet other embodiments, the composite film 601 may have a particular reflectance. For example, the composite film 601 may have a reflectance of not greater than about 7.0%, such as, not greater than about 6.9% or not greater than about 6.8% or not greater than about 6.7% or not greater than about 6.6% or not greater than about 6.5% or not greater than about 6.4% or not greater than about 6.3% or not greater than about 6.2% or not greater than about 6.1% or not greater than about 6.0% or not greater than about 5.9% or not greater than about 5.8% or not greater than about 5.7% or not greater than about 5.6% or not greater than about 5.5% or not greater than about 5.4% or not greater than about 5.3% or not greater than about 5.2% or not greater than about 5.1% or not greater than about 5.0%. It will be appreciated that the composite film 601 may have a reflectance within a range between, an including, any of the minimum and maximum values noted above. It will be further appreciated that the composite film 601 may have a reflectance of any value between, and including, any of the minimum and maximum values noted above.

According to embodiments described herein, an anti-reflective coating as described herein may be applied to another layer, for example, a substrate or another coating, using wet coating methods, such as, Meyer rod methods, gravure methods, reverse gravure methods, mini gravure methods, slot die methods, spray coating methods or dip coating methods. According to yet other embodiments described herein, the newly applied coating may be dried in an oven to remove solvents. According to yet other embodiments, the dried coating may then be cured by UV light, electronic beam, and other high energy beam heating.

According to still other embodiments, the pressure sensitive adhesive layers described herein may be applied a substrate or another coating, using wet coating methods, such as, Meyer rod methods, gravure methods, reverse gravure methods, mini gravure methods, slot die methods, spray coating methods or dip coating methods.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the embodiments as listed below.

Embodiment 1. A composite film comprising: a first transparent substrate; and a first anti-reflective coating overlying a first surface of the first transparent substrate, wherein the first anti-reflective coating comprises: a first UV curable acrylate binder, a photo initiator component, silica nanoparticles dispersed within the first anti-reflective coating, and a ratio $AC1_{SiO2}/AC1_B$ of at least about 0.01 and not greater than about 1.3, where $AC1_{SiO2}$ is the concentration of the silica nanoparticles in the first anti-reflective coating in weight percent for a total weight of the first anti-reflective coating and $AC1_B$ is the concentration of the first UV curable acrylate binder in the first anti-reflective coating in weight percent for a total weight of the first anti-reflective coating, wherein the composite film has a VLT of at least about 93.0%, and wherein the composite film has a haze value of not greater than about 3%.

Embodiment 2. A composite film comprising: a first transparent substrate; and a first anti-reflective coating overlying a first surface of the first transparent substrate, wherein the first anti-reflective coating comprises: a first UV curable acrylate binder at a concentration of at least about 40 wt. % and not greater than about 95 wt. % for a total weight of the first anti-reflective coating, a photo initiator component at a concentration of at least about 2.0 wt. % and not greater than about 10 wt. % for a total weight of the first anti-reflective coating, and silica nanoparticles dispersed within the first anti-reflective coating at a concentration of at least about 5 wt. % and not greater than about 60 wt. % for a total weight of the first anti-reflective coating, wherein the composite film has a VLT of at least about 93.0%, and wherein the composite film has a haze value of not greater than about 3%.

Embodiment 3. The composite film of any one of embodiments 1 and 2, wherein the composite film has a VLT of at least about 93.2% or at least about 93.4% or at least about 93.6% or at least about 93.8% or at least about 94.0% or at least about 94.2% or at least about 94.4% or at least about 94.6% or at least about 94.8% or at least about 95.0% or at least about 95.2% or at least about 95.4% or at least about 95.6% or at least about 95.8% or at least about 96.0%.

Embodiment 4. The composite film of any one of embodiments 1 and 2, wherein the composite film has a haze value of not greater than about 3% or not greater than about 2.9% or not greater than about 2.8% or not greater than about 2.7% or not greater than about 2.6% or not greater than about 2.5% or not greater than about 2.4% or not greater than about 2.3% or not greater than about 2.2% or not greater than about 2.1% or not greater than about 2.0% or not greater than about 1.9% or not greater than about 1.8% or not greater than about 1.7% or not greater than about 1.6% or not greater than about 1.5% or not greater than about 1.4% or not greater than about 1.3%.

Embodiment 5. The composite film of any one of embodiments 1 and 2, wherein the composite film comprises a reflectance of not greater than about 7.0% or not greater than about 6.9% or not greater than about 6.8% or not greater than about 6.7% or not greater than about 6.6% or not greater than about 6.5% or not greater than about 6.4% or not greater than about 6.3% or not greater than about 6.2% or not greater than about 6.1% or not greater than about 6.0% or not greater than about 5.9% or not greater than about 5.8% or not greater than about 5.7% or not greater than about 5.6% or not greater than about 5.5% or not greater than about 5.4% or not greater than about 5.3% or not greater than about 5.2% or not greater than about 5.1% or not greater than about 5.0%.

Embodiment 6. The composite film of any one of embodiments 1 and 2, wherein the first anti-reflective coating has a thickness of at least about 50 nm or at least about 60 nm or at least about 70 nm or at least about 80 nm or at least about 90 nm or at least about 100 nm or at least about 110 nm or at least about 120 nm or at least about 130 nm or at least about 140 nm or at least about 150 nm or at least about 160 nm or at least about 170 nm or at least about 180 nm or at least about 190 nm or at least about 200 nm.

Embodiment 7. The composite film of any one of embodiments 1 and 2, wherein the first anti-reflective coating has a thickness of not greater than about 500 nm or not greater than about 490 nm or not greater than about 480 nm or not greater than about 470 nm or not greater than about 460 nm or not greater than about 450 nm or not greater than about 440 nm or not greater than about 430 nm or not greater than about 420 nm or not greater than about 410 nm or not greater than about 400 nm or not greater than about 390 nm or not greater than about 380 nm or not greater than about 370 nm or not greater than about 360 nm or not greater than about 350 nm or not greater than about 340 nm or not greater than about 330 nm or not greater than about 320 nm or not greater than about 310 nm or not greater than about 300 nm.

Embodiment 8. The composite film of any one of embodiments 1 and 2, wherein the first anti-reflective coating comprises a ratio $AC1_{SiO2}/AC1_B$ of at least about 0.01, where $AC1_{SiO2}$ is the concentration of the silica nanoparticles in the first anti-reflective coating in weight percent for a total weight of the first anti-reflective coating and $AC1_B$ is the concentration of the first UV curable acrylate binder in the first anti-reflective coating in weight percent for a total weight of the first anti-reflective coating or at least about 0.05 or at least about 0.07 or at least about 0.1 or at least about 0.12 or at least about 0.15 or at least about 0.17 or at least about 0.20 or at least about 0.22 or at least about 0.25 or at least about 0.27 or at least about 0.30.

Embodiment 9. The composite film of any one of embodiments 1 and 2, wherein the first anti-reflective coating comprises a ratio $AC1_{SiO2}/AC1_B$ of not greater than about 1.3, where $AC1_{SiO2}$ is the concentration of the silica nanoparticles in the first anti-reflective coating in weight percent for a total weight of the first anti-reflective coating and $AC1_B$ is the concentration of the first UV curable acrylate binder in the first anti-reflective coating in weight percent for a total weight of the first anti-reflective coating or not greater than about 1.2 or not greater than about 1.1 or not greater than about 1.0 or not greater than about 0.9 or not greater than about 0.8 or not greater than about 0.7 or not greater than about 0.6 or not greater than about 0.5.

Embodiment 10. The composite film of any one of embodiments 1 and 2, wherein the first UV curable acrylate binder in the first anti-reflective coating comprises SR351LV, SR355, SR399, tetrafunctional acrylate monomer, pentafunctional acrylate monomers, pentaerythritol Tri-Tetraacrylate (PETIA), Ebecry 140, Ebecryl 180, multifunctional oligomers, or UV resins.

Embodiment 11. The composite film of any one of embodiments 1 and 2, wherein the first anti-reflective coating comprises the first UV curable acrylate binder at a concentration of at least about 40 wt. % for a total weight of the first anti-reflective coating or at least about 42 wt. % or at least about 44 wt. % or at least about 46 wt. % or at least about 48 wt. % or at least about 50 wt. % or at least about 52 wt. % or at least about 54 wt. % or at least about 56 wt. % or at least about 58 wt. % or at least about 60 wt. %.

Embodiment 12. The composite film of any one of embodiments 1 and 2, wherein the first anti-reflective coating comprises the first UV curable acrylate binder at a concentration of not greater than about 95 wt. % for a total weight of the first anti-reflective coating or not greater than about 93 wt. % or not greater than about 90 wt. % or not greater than about 88 wt. % or not greater than about 85 wt. % or not greater than about 83 wt. % or not greater than about 80 wt. % or not greater than about 78 wt. % or not greater than about 75 wt. % or not greater than about 73 wt. % or not greater than about 70 wt. %.

Embodiment 13. The composite film of any one of embodiments 1 and 2, wherein the photo initiator component in the first anti-reflective coating comprises Omnirad 184, Omnirad 819, Omnirad 1173, CPI 6976, other similar photo initiators, or any combination herein.

Embodiment 14. The composite film of any one of embodiments 1 and 2, wherein the first anti-reflective coating comprises the photo initiator component at a concentration of at least about 2 wt. % for a total weight of the first anti-reflective coating or at least about 2.2 wt. % or at least about 2.5 wt. % or at least about 2.7 wt. % or at least about 3.0 wt. % or at least about 3.2 wt. % or at least about 3.5 wt. % or at least about 3.7 wt. % or at least about 4.0 wt. % or at least about 4.2 wt. % or at least about 4.5 wt. % or at least about 4.7 wt. % or at least about 5.0 wt. % or at least about 5.2 wt. % or at least about 5.5 wt. %.

Embodiment 15. The composite film of any one of embodiments 1 and 2, wherein the first anti-reflective coating comprises the photo initiator component at a concentration of not greater than about 10 wt. % for a total weight of the first anti-reflective coating or not greater than about 9.8 wt. % or not greater than about 9.5 wt. % or not greater than about 9.3 wt. % or not greater than about 9.0 wt. % or not greater than about 8.8 wt. % or not greater than about 8.5 wt. % or not greater than about 8.3 wt. % or not greater than about 8.0 wt. % or not greater than about 7.8 wt. % or not greater than about 7.5 wt. % or not greater than about 7.3 wt. % or not greater than about 7.0 wt. % or not greater than about 6.8 wt. % or not greater than about 6.5 wt. %.

Embodiment 16. The composite film of any one of embodiments 1 and 2, wherein the first anti-reflective coating comprises silica nanoparticles at a concentration of at least about 5 wt. % for a total weight of the first anti-reflective coating or at least about 6 wt. % or at least about 7 wt. % or at least about 8 wt. % or at least about 9 wt. % or at least about 10 wt. % or at least about 11 wt. % or at least about 12 wt. % or at least about 13 wt. % or at least about 14 wt. % or at least about 15 wt. % or at least about 16 wt. % or at least about 17 wt. % or at least about 18 wt. % or at least about 19 wt. % or at least about 20 wt. % or at least about 21 wt. % or at least about 22 wt. % or at least about 23 wt. % or at least about 24 wt. % or at least about 25 wt. %.

Embodiment 17. The composite film of any one of embodiments 1 and 2, wherein the first anti-reflective coating comprises silica nanoparticles at a concentration of not greater than about 60 wt. % or a total weight of the first anti-reflective coating or not greater than about 58 wt. % or not greater than about 55 wt. % or not greater than about 53 wt. % or not greater than about 50 wt. % or not greater than about 48 wt. % or not greater than about 45 wt. % or not greater than about 43 wt. % or not greater than about 40 wt. % or not greater than about 38 wt. % or not greater than about 35 wt. % or not greater than about 33 wt. % or not greater than about 30 wt. %.

Embodiment 18. The anti-reflective coating of embodiment 2, wherein the silica nanoparticles in the first anti-reflective coating are surface treated silica nanoparticles.

Embodiment 19. The anti-reflective coating of embodiment 18, wherein the silica nanoparticles in the first anti-reflective coating are surface treated with polysiloxane, acrylate or a combination thereof.

Embodiment 20. The composite film of any one of embodiments 1 and 2, wherein the silica nanoparticles in the first anti-reflective coating are generally solid silica nanoparticles.

Embodiment 21. The composite film of any one of embodiments 1 and 2, wherein the silica nanoparticles in the first anti-reflective coating have an average particle size (D50) of at least about 1 nm or at least about 2 nm or at least about 3 nm or at least about 4 nm or at least about 5 nm or at least about 6 nm or at least about 7 nm or at least about 8 nm or at least about 10 nm or at least about 11 nm or at least about 12 nm or at least about 13 nm or at least about 14 nm or at least about 15 nm or at least about 16 nm or at least about 17 nm or at least about 18 nm.

Embodiment 22. The composite film of any one of embodiments 1 and 2, wherein the silica nanoparticles in the first anti-reflective coating have an average particle size (D50) of not greater than about 500 nm or not greater than about 400 nm or not greater than about 300 nm or not greater than about 200 nm or not greater than about 100 nm or not greater than about 95 nm or not greater than about 90 nm or not greater than about 85 nm or not greater than about 80 nm or not greater than about 75 nm or not greater than about 65 nm or not greater than about 60 nm or not greater than about 55 nm or not greater than about 50 nm or not greater than about 45 nm or not greater than about 40 nm or not greater than about 35 nm or not greater than about 30 nm or not greater than about 25 nm.

Embodiment 23. The composite film of any one of embodiments 1 and 2, wherein the first anti-reflective coating comprises a slip agent.

Embodiment 24. The composite film of embodiment 23, wherein the slip agent comprises Tego glide 410, Tegorad 2100, Tegorad 2300, Tegorad 2500, BYK306, BYK307, and any combination thereof.

Embodiment 25. The composite film of embodiment 23, wherein the first anti-reflective coating comprises the slip agent at a concentration of at least about 0.01 wt. % for a total weight of the first anti-reflective coating.

Embodiment 26. The composite film of embodiment 23, wherein the first anti-reflective coating comprises the slip agent at a concentration of not greater than about 5 wt. % for a total weight of the first anti-reflective coating.

Embodiment 27. The composite film of any one of embodiments 1 and 2, wherein the first anti-reflective coating comprises a wetting agent.

Embodiment 28. The composite film of embodiment 27, wherein the wetting agent comprises BYK-377, BYK-UV 3500, Tego 270, or any combination thereof.

Embodiment 29. The composite film of embodiment 27, wherein the first anti-reflective coating comprises the wetting agent at a concentration of at least about 0.01 wt. % for a total weight of the first anti-reflective coating.

Embodiment 30. The composite film of embodiment 27, wherein the first anti-reflective coating comprises the wetting agent at a concentration of not greater than about 0.3 wt. % for a total weight of the first anti-reflective coating.

Embodiment 31. The composite film of any one of embodiments 1 and 2, wherein the first anti-reflective coating comprises a surface energy modifier.

Embodiment 32. The composite film of embodiment 31, wherein the surface energy modifier comprises BYK-315, BYK-300, BYK-310, BY-378, or any combination thereof.

Embodiment 33. The composite film of embodiment 31, wherein the first anti-reflective coating comprises the surface energy modifier at a concentration of at least about 0.01 wt. % for a total weight of the first anti-reflective coating.

Embodiment 34. The composite film of embodiment 31, wherein the first anti-reflective coating comprises the surface energy modifier at a concentration of not greater than about 0.3 wt. % for a total weight of the first anti-reflective coating.

Embodiment 35. The composite film of any one of embodiments 1 and 2, wherein the first anti-reflective coating comprises a second UV curable acrylate binder.

Embodiment 36. The composite film of embodiment 35, wherein the second UV curable acrylate binder comprises SR351LV, SR355, SR399, tetrafunctional acrylate monomer, pentafunctional acrylate monomers, pentaerythritol Tri-Tetraacrylate (PETIA), Ebecry 140, Ebecryl 180, multifunctional oligomers, or UV resins.

Embodiment 37. The composite film of embodiment 35, wherein the first anti-reflective coating comprises the second UV curable acrylate binder at a concentration of at least about 5.0 wt. % for a total weight of the first anti-reflective coating.

Embodiment 38. The composite film of embodiment 35, wherein the first anti-reflective coating comprises the second UV curable acrylate binder at a concentration of not greater than about 60 wt. % for a total weight of the first anti-reflective coating.

Embodiment 39. The composite film of any one of the previous embodiments, wherein the first transparent substrate comprises a PET film.

Embodiment 40. The composite film of any one of the previous embodiments, wherein the first transparent substrate comprises an optically clear PET film.

Embodiment 41. The composite film of any one of the previous embodiments, wherein the first transparent substrate comprises a single layer optically clear PET film.

Embodiment 42. The composite film of any one of embodiments 39, 40, and 41, wherein PET film comprises a thickness of at least about 5 mil or at least about 6 mil or at least about 7 mil or at least about 8 mil or at least about 9 mil or at least about 10 mil.

Embodiment 43. The composite film of any one of embodiments 39, 40, and 41, wherein PET film comprises a thickness of not greater than about 15 mil or not greater than about 14 mil or not greater than about 13 mil or not greater than about 12 mil or not greater than about 11 mil.

Embodiment 44. The composite film of any one of the previous embodiments, wherein the composite film further comprises a second anti-reflective coating comprising a first UV curable acrylate binder, a photo initiator component, and silica nanoparticles dispersed within the second anti-reflective coating.

Embodiment 45. The composite film of embodiment 44, wherein the second anti-reflective coating overlies a second surface of the first transparent substrate, wherein the second surface of the first transparent substrate is parallel to and opposite of the first surface of the first transparent substrate.

Embodiment 46. The composite film of embodiment 45, wherein the second anti-reflective coating has a thickness of at least about 50 nm or at least about 60 nm or at least about 70 nm or at least about 80 nm or at least about 90 nm or at least about 100 nm or at least about 110 nm or at least about 120 nm or at least about 130 nm or at least about 140 nm or at least about 150 nm or at least about 160 nm or at least about 170 nm or at least about 180 nm or at least about 190 nm or at least about 200 nm.

Embodiment 47. The composite film of embodiment 45, wherein the second anti-reflective coating has a thickness of not greater than about 500 nm or not greater than about 490 nm or not greater than about 480 nm or not greater than about 470 nm or not greater than about 460 nm or not greater than about 450 nm or not greater than about 440 nm or not greater than about 430 nm or not greater than about 420 nm or not greater than about 410 nm or not greater than about 400 nm or not greater than about 390 nm or not greater than about 380 nm or not greater than about 370 nm or not greater than about 360 nm or not greater than about 350 nm or not greater than about 340 nm or not greater than about 330 nm or not greater than about 320 nm or not greater than about 310 nm or not greater than about 300 nm.

Embodiment 48. The composite film of embodiment 45, wherein the second anti-reflective coating comprises a ratio $AC2_{SiO2}/AC2_B$ of at least about 0.01, where $AC2_{SiO2}$ is the concentration of the silica nanoparticles in the second anti-reflective coating in weight percent for a total weight of the second anti-reflective coating and $AC2_B$ is the concentration of the second UV curable acrylate binder in the second anti-reflective coating in weight percent for a total weight of the second anti-reflective coating or at least about 0.05 or at least about 0.07 or at least about 0.1 or at least about 0.12 or at least about 0.15 or at least about 0.17 or at least about 0.20 or at least about 0.22 or at least about 0.25 or at least about 0.27 or at least about 0.30.

Embodiment 49. The composite film of embodiment 45, wherein the second anti-reflective coating comprises a ratio $AC2_{SiO2}/AC2_B$ of not greater than about 1.3, where $AC2_{SiO2}$ is the concentration of the silica nanoparticles in the second anti-reflective coating in weight percent for a total weight of the second anti-reflective coating and $AC2_B$ is the concentration of the second UV curable acrylate binder in the second anti-reflective coating in weight percent for a total weight of the second anti-reflective coating or not greater than about 1.2 or not greater than about 1.1 or not greater than about 1.0 or not greater than about 0.9 or not greater than about 0.8 or not greater than about 0.7 or not greater than about 0.6 or not greater than about 0.5.

Embodiment 50. The composite film of embodiment 45, wherein the UV curable acrylate in the second binder anti-reflective coating comprises SR351LV, SR355, SR399, tetrafunctional acrylate monomer, pentafunctional acrylate monomers, pentaerythritol Tri-Tetraacrylate (PETIA), Ebecry 140, Ebecryl 180, multifunctional oligomers, or UV resins.

Embodiment 51. The composite film of embodiment 45, wherein the second anti-reflective coating comprises the first UV curable acrylate binder at a concentration of at least about 40 wt. % for a total weight of the second anti-reflective coating or at least about 42 wt. % or at least about 44 wt. % or at least about 46 wt. % or at least about 48 wt. % or at least about 50 wt. % or at least about 52 wt. % or at least about 54 wt. % or at least about 56 wt. % or at least about 58 wt. % or at least about 60 wt. %.

Embodiment 52. The composite film of embodiment 45, wherein the second anti-reflective coating comprises the first UV curable acrylate binder at a concentration of not greater than about 95 wt. % for a total weight of the second anti-reflective coating or not greater than about 93 wt. % or not greater than about 90 wt. % or not greater than about 88 wt. % or not greater than about 85 wt. % or not greater than about 83 wt. % or not greater than about 80 wt. % or not greater than about 78 wt. % or not greater than about 75 wt. % or not greater than about 73 wt. % or not greater than about 70 wt. %.

Embodiment 53. The composite film of embodiment 45, wherein the photo initiator component in the second anti-reflective coating comprises Omnirad 184, Omnirad 819, Omnirad 1173, CPI 6976, other similar photo initiators, or any combination herein.

Embodiment 54. The composite film of embodiment 45, wherein the second anti-reflective coating comprises the photo initiator component a concentration of at least about 2 wt. % for a total weight of the second anti-reflective coating or at least about 2.2 wt. % or at least about 2.5 wt. % or at least about 2.7 wt. % or at least about 3.0 wt. % or at least about 3.2 wt. % or at least about 3.5 wt. % or at least about 3.7 wt. % or at least about 4.0 wt. % or at least about 4.2 wt. % or at least about 4.5 wt. % or at least about 4.7 wt. % or at least about 5.0 wt. % or at least about 5.2 wt. % or at least about 5.5 wt. %.

Embodiment 55. The composite film of embodiment 45, wherein the second anti-reflective coating comprises the photo initiator component a concentration of not greater than about 10 wt. % for a total weight of the second anti-reflective coating or not greater than about 9.8 wt. % or not greater than about 9.5 wt. % or not greater than about 9.3 wt. % or not greater than about 9.0 wt. % or not greater than about 8.8 wt. % or not greater than about 8.5 wt. % or not greater than about 8.3 wt. % or not greater than about 8.0 wt. % or not greater than about 7.8 wt. % or not greater than about 7.5 wt. % or not greater than about 7.3 wt. % or not greater than about 7.0 wt. % or not greater than about 6.8 wt. % or not greater than about 6.5 wt. %.

Embodiment 56. The composite film of embodiment 45, wherein the second anti-reflective coating comprises silica nanoparticles at a concentration of at least about 5 wt. % for a total weight of the second anti-reflective coating or at least about 6 wt. % or at least about 7 wt. % or at least about 8 wt. % or at least about 9 wt. % or at least about 10 wt. % or at least about 11 wt. % or at least about 12 wt. % or at least about 13 wt. % or at least about 14 wt. % or at least about 15 wt. % or at least about 16 wt. % or at least about 17 wt. % or at least about 18 wt. % or at least about 19 wt. % or at least about 20 wt. % or at least about 21 wt. % or at least about 22 wt. % or at least about 23 wt. % or at least about 24 wt. % or at least about 25 wt. %.

Embodiment 57. The composite film of embodiment 45, wherein the second anti-reflective coating comprises silica nanoparticles at a concentration of not greater than about 60 wt. % or a total weight of the second anti-reflective coating or not greater than about 58 wt. % or not greater than about 55 wt. % or not greater than about 53 wt. % or not greater than about 50 wt. % or not greater than about 48 wt. % or not greater than about 45 wt. % or not greater than about 43 wt. % or not greater than about 40 wt. % or not greater than about 38 wt. % or not greater than about 35 wt. % or not greater than about 33 wt. % or not greater than about 30 wt. %.

Embodiment 58. The composite film of embodiment 45, wherein the silica nanoparticles in the second anti-reflective coating are surface treated silica nanoparticles.

Embodiment 59. The anti-reflective coating of embodiment 58, wherein the silica nanoparticles in the second anti-reflective coating are surface treated with polysiloxane, acrylate or a combination thereof.

Embodiment 60. The composite film of embodiment 45, wherein the silica nanoparticles in the second anti-reflective coating are generally solid silica nanoparticles.

Embodiment 61. The composite film of embodiment 45, wherein the silica nanoparticles in the second anti-reflective coating have an average particle size (D50) of at least about 1 nm or at least about 2 nm or at least about 3 nm or at least about 4 nm or at least about 5 nm or at least about 6 nm or at least about 7 nm or at least about 8 nm or at least about 10 nm or at least about 11 nm or at least about 12 nm or at least about 13 nm or at least about 14 nm or at least about 15 nm or at least about 16 nm or at least about 17 nm or at least about 18 nm.

Embodiment 62. The composite film of embodiment 45, wherein the silica nanoparticles in the second anti-reflective coating have an average particle size (D50) of not greater than about 500 nm or not greater than about 400 nm or not greater than about 300 nm or not greater than about 200 nm or not greater than about 100 nm or not greater than about 95 nm or not greater than about 90 nm or not greater than about 85 nm or not greater than about 80 nm or not greater than about 75 nm or not greater than about 65 nm or not greater than about 60 nm or not greater than about 55 nm or not greater than about 50 nm or not greater than about 45 nm or not greater than about 40 nm or not greater than about 35 nm or not greater than about 30 nm or not greater than about 25 nm.

Embodiment 63. The composite film of embodiment 45, wherein the second anti-reflective coating comprises a slip agent.

Embodiment 64. The composite film of embodiment 63, wherein the slip agent comprises Tego glide 410, Tegorad 2100, Tegorad 2300, Tegorad 2500, BYK306, BYK307, and any combination thereof.

Embodiment 65. The composite film of embodiment 63, wherein the second anti-reflective coating comprises the slip agent at a concentration of at least about 0.01 wt. % for a total weight of the first anti-reflective coating.

Embodiment 66. The composite film of embodiment 63, wherein the first anti-reflective coating comprises the slip agent at a concentration of not greater than about 5 wt. % for a total weight of the first anti-reflective coating.

Embodiment 67. The composite film of embodiment 45, wherein the second anti-reflective coating comprises a wetting agent.

Embodiment 68. The composite film of embodiment 67, wherein the wetting agent comprises BYK-377, BYK-UV 3500, Tego 270, or any combination thereof.

Embodiment 69. The composite film of embodiment 67, wherein the second anti-reflective coating comprises the wetting agent at a concentration of at least about 0.01 wt. % for a total weight of the second anti-reflective coating.

Embodiment 70. The composite film of embodiment 67, wherein the second anti-reflective coating comprises the wetting agent at a concentration of not greater than about 0.3 wt. % for a total weight of the second anti-reflective coating.

Embodiment 71. The composite film of embodiment 45, wherein the second anti-reflective coating comprises a surface energy modifier.

Embodiment 72. The composite film of embodiment 71, wherein the surface energy modifier comprises BYK-315, BYK-300, BYK-310, BY-378, or any combination thereof.

Embodiment 73. The composite film of embodiment 71, wherein the second anti-reflective coating comprises the surface energy modifier at a concentration of at least about 0.01 wt. % for a total weight of the second anti-reflective coating.

Embodiment 74. The composite film of embodiment 71, wherein the second anti-reflective coating comprises the surface energy modifier at a concentration of not greater than about 0.3 wt. % for a total weight of the second anti-reflective coating.

Embodiment 75. The composite film of embodiment 45, wherein the second anti-reflective coating comprises a second UV curable acrylate binder.

Embodiment 76. The composite film of embodiment 75, wherein the second UV curable acrylate binder comprises SR351LV, SR355, SR399, tetrafunctional acrylate monomer, pentafunctional acrylate monomers, pentaerythritol Tri-Tetraacrylate (PETIA), Ebecry 140, Ebecryl 180, multifunctional oligomers, or UV resins.

Embodiment 77. The composite film of embodiment 75, wherein the second anti-reflective coating comprises the second UV curable acrylate binder at a concentration of at least about 5.0 wt. % for a total weight of the second anti-reflective coating.

Embodiment 78. The composite film of embodiment 75, wherein the second anti-reflective coating comprises the second UV curable acrylate binder at a concentration of not greater than about 60 wt. % for a total weight of the second anti-reflective coating.

Embodiment 79. The composite film of any one of the previous embodiments, wherein the composite film further comprises a first adhesive layer overlying a surface of the first anti-reflective film.

Embodiment 80. The composite film of embodiment 79, wherein the first adhesive layer comprises Aroset 1452, Aroset 1450, Aroset 6428 from Ashland, Duro-Tak 222A, Duro-Tak80-1093 or combinations thereof.

Embodiment 81. The composite film of embodiment 79, wherein the first adhesive layer has a thickness of at least about 1 μm.

Embodiment 82. The composite film of embodiment 79, wherein the first adhesive layer has a thickness of not greater than about 50 μm.

Embodiment 83. The composite film of embodiment 79, wherein the first adhesive layer comprises nanoparticles.

Embodiment 84. The composite film of embodiment 83, wherein the nanoparticles in the first adhesive layer comprise surface treated silica nanoparticles.

Embodiment 85. The composite film of embodiment 83, wherein the nanoparticles in the first adhesive layer have an average particle size (D50) of at least about 1 nm or at least about 2 nm or at least about 3 nm or at least about 4 nm or at least about 5 nm or at least about 6 nm or at least about 7 nm or at least about 8 nm or at least about 10 nm or at least about 11 nm or at least about 12 nm or at least about 13 nm or at least about 14 nm or at least about 15 nm or at least about 16 nm or at least about 17 nm or at least about 18 nm.

Embodiment 86. The composite film of embodiment 83, wherein the nanoparticles in the first adhesive layer have an average particle size (D50) of not greater than about 500 nm or not greater than about 400 nm or not greater than about 300 nm or not greater than about 200 nm or not greater than about 100 nm or not greater than about 95 nm or not greater than about 90 nm or not greater than about 85 nm or not greater than about 80 nm or not greater than about 75 nm or not greater than about 65 nm or not greater than about 60 nm or not greater than about 55 nm or not greater than about 50 nm or not greater than about 45 nm or not greater than about 40 nm or not greater than about 35 nm or not greater than about 30 nm or not greater than about 25 nm.

Embodiment 87. The composite film of any one of the previous embodiments, wherein the composite film further comprises a second transparent substrate overlying the first adhesive layer.

Embodiment 88. The composite film of embodiment 87, wherein the second transparent substrate comprises a PET film.

Embodiment 89. The composite film of embodiment 87, wherein the second transparent substrate comprises an optically clear PET film.

Embodiment 90. The composite film of embodiment 87, wherein the second transparent substrate comprises a single layer optically clear PET film.

Embodiment 91. The composite film of embodiment 87, wherein the second transparent substrate comprises a thickness of at least about 1 mil or at least about 2 mil or at least about 3 mil or at least about 4 mil or at least about 5 mil.

Embodiment 92. The composite film of embodiment 87, wherein the second transparent substrate comprises a thickness of not greater than about 15 mil or not greater than about 14 mil or not greater than about 13 mil or not greater than about 12 mil or not greater than about 11 mil.

Embodiment 93. The composite film of any one of the previous embodiments, wherein the composite film further comprises a second adhesive layer overlying a surface of the second transparent substrate.

Embodiment 94. The composite film of embodiment 93, wherein the second adhesive layer comprises Aroset 1452, Aroset 1450, Aroset 6428 from Ashland, Duro-Tak 222A, Duro-Tak80-1093 or combinations thereof.

Embodiment 95. The composite film of embodiment 93, wherein the second adhesive layer has a thickness of at least about 1 µm.

Embodiment 96. The composite film of embodiment 93, wherein the second adhesive layer has a thickness of not greater than about 50 µm.

Embodiment 97. The composite film of embodiment 93, wherein the second adhesive layer comprises nanoparticles.

Embodiment 98. The composite film of embodiment 93, wherein the nanoparticles in the second adhesive layer comprise surface treated silica nanoparticles.

Embodiment 99. The composite film of embodiment 93, wherein the nanoparticles in the second adhesive layer have an average particle size (D50) of at least about 1 nm or at least about 2 nm or at least about 3 nm or at least about 4 nm or at least about 5 nm or at least about 6 nm or at least about 7 nm or at least about 8 nm or at least about 10 nm or at least about 11 nm or at least about 12 nm or at least about 13 nm or at least about 14 nm or at least about 15 nm or at least about 16 nm or at least about 17 nm or at least about 18 nm.

Embodiment 100. The composite film of embodiment 93, wherein the nanoparticles in the second adhesive layer have an average particle size (D50) of not greater than about 500 nm or not greater than about 400 nm or not greater than about 300 nm or not greater than about 200 nm or not greater than about 100 nm or not greater than about 95 nm or not greater than about 90 nm or not greater than about 85 nm or not greater than about 80 nm or not greater than about 75 nm or not greater than about 65 nm or not greater than about 60 nm or not greater than about 55 nm or not greater than about 50 nm or not greater than about 45 nm or not greater than about 40 nm or not greater than about 35 nm or not greater than about 30 nm or not greater than about 25 nm.

Embodiment 101. The composite film of embodiment 93, wherein the composite film further comprises a third anti-reflective coating overlying a surface of the second transparent substrate, wherein the third anti-reflective coating comprises a second anti-reflective coating comprising a first UV curable acrylate binder, a photo initiator component, and silica nanoparticles dispersed within the second anti-reflective coating.

Embodiment 102. The composite film of embodiment 101, wherein the third anti-reflective coating has a thickness of at least about 50 nm or at least about 60 nm or at least about 70 nm or at least about 80 nm or at least about 90 nm or at least about 100 nm or at least about 110 nm or at least about 120 nm or at least about 130 nm or at least about 140 nm or at least about 150 nm or at least about 160 nm or at least about 170 nm or at least about 180 nm or at least about 190 nm or at least about 200 nm.

Embodiment 103. The composite film of embodiment 101, wherein the third anti-reflective coating has a thickness of not greater than about 500 nm or not greater than about 490 nm or not greater than about 480 nm or not greater than about 470 nm or not greater than about 460 nm or not greater than about 450 nm or not greater than about 440 nm or not greater than about 430 nm or not greater than about 420 nm or not greater than about 410 nm or not greater than about 400 nm or not greater than about 390 nm or not greater than about 380 nm or not greater than about 370 nm or not greater than about 360 nm or not greater than about 350 nm or not greater than about 340 nm or not greater than about 330 nm or not greater than about 320 nm or not greater than about 310 nm or not greater than about 300 nm.

Embodiment 104. The composite film of embodiment 101, wherein the third anti-reflective coating comprises a ratio $AC3_{SiO2}/AC3_B$ of at least about 0.01, where $AC3_{SiO2}$ is the concentration of the silica nanoparticles in the third anti-reflective coating in weight percent for a total weight of the third anti-reflective coating and $AC3_B$ is the concentration of the third UV curable acrylate binder in the third anti-reflective coating in weight percent for a total weight of the third anti-reflective coating or at least about 0.05 or at least about 0.07 or at least about 0.1 or at least about 0.12 or at least about 0.15 or at least about 0.17 or at least about 0.20 or at least about 0.22 or at least about 0.25 or at least about 0.27 or at least about 0.30.

Embodiment 105. The composite film of embodiment 101, wherein the third anti-reflective coating comprises a ratio $AC3_{SiO2}/AC3_B$ of not greater than about 1.3, where $AC3_{SiO2}$ is the concentration of the silica nanoparticles in the third anti-reflective coating in weight percent for a total weight of the third anti-reflective coating and $AC3_B$ is the concentration of the third UV curable acrylate binder in the third anti-reflective coating in weight percent for a total weight of the third anti-reflective coating or not greater than about 1.2 or not greater than about 1.1 or not greater than about 1.0 or not greater than about 0.9 or not greater than about 0.8 or not greater than about 0.7 or not greater than about 0.6 or not greater than about 0.5.

Embodiment 106. The composite film of embodiment 101, wherein the UV curable acrylate binder in the third anti-reflective coating comprises SR351LV, SR355, SR399, tetrafunctional acrylate monomer, pentafunctional acrylate monomers, pentaerythritol Tri-Tetraacrylate (PETIA), Ebecry 140, Ebecryl 180, multifunctional oligomers, or UV resins.

Embodiment 107. The composite film of embodiment 101, wherein the third anti-reflective coating comprises the first UV curable acrylate binder at a concentration of at least about 40 wt. % for a total weight of the third anti-reflective coating or at least about 42 wt. % or at least about 44 wt. % or at least about 46 wt. % or at least about 48 wt. % or at least about 50 wt. % or at least about 52 wt. % or at least about 54 wt. % or at least about 56 wt. % or at least about 58 wt. % or at least about 60 wt. %.

Embodiment 108. The composite film of embodiment 101, wherein the third anti-reflective coating comprises the first UV curable acrylate binder at a concentration of not greater than about 95 wt. % for a total weight of the third anti-reflective coating or not greater than about 93 wt. % or not greater than about 90 wt. % or not greater than about 88 wt. % or not greater than about 85 wt. % or not greater than about 83 wt. % or not greater than about 80 wt. % or not greater than about 78 wt. % or not greater than about 75 wt. % or not greater than about 73 wt. % or not greater than about 70 wt. %.

Embodiment 109. The composite film of embodiment 101, wherein the photo initiator component in the third anti-reflective coating comprises Omnirad 184, Omnirad 819, Omnirad 1173, CPI 6976, other similar photo initiators, or any combination herein.

Embodiment 110. The composite film of embodiment 101, wherein the third anti-reflective coating comprises the photo initiator component a concentration of at least about 2 wt. % for a total weight of the third anti-reflective coating or at least about 2.2 wt. % or at least about 2.5 wt. % or at least about 2.7 wt. % or at least about 3.0 wt. % or at least about 3.2 wt. % or at least about 3.5 wt. % or at least about 3.7 wt. % or at least about 4.0 wt. % or at least about 4.2 wt. % or at least about 4.5 wt. % or at least about 4.7 wt. % or at least about 5.0 wt. % or at least about 5.2 wt. % or at least about 5.5 wt. %.

Embodiment 111. The composite film of embodiment 101, wherein the third anti-reflective coating comprises the photo initiator component a concentration of not greater than about 10 wt. % for a total weight of the third anti-reflective coating or not greater than about 9.8 wt. % or not greater than about 9.5 wt. % or not greater than about 9.3 wt. % or not greater than about 9.0 wt. % or not greater than about 8.8 wt. % or not greater than about 8.5 wt. % or not greater than about 8.3 wt. % or not greater than about 8.0 wt. % or not greater than about 7.8 wt. % or not greater than about 7.5 wt. % or not greater than about 7.3 wt. % or not greater than about 7.0 wt. % or not greater than about 6.8 wt. % or not greater than about 6.5 wt. %.

Embodiment 112. The composite film of embodiment 101, wherein the third anti-reflective coating comprises silica nanoparticles at a concentration of at least about 5 wt. % for a total weight of the third anti-reflective coating or at least about 6 wt. % or at least about 7 wt. % or at least about 8 wt. % or at least about 9 wt. % or at least about 10 wt. % or at least about 11 wt. % or at least about 12 wt. % or at least about 13 wt. % or at least about 14 wt. % or at least about 15 wt. % or at least about 16 wt. % or at least about 17 wt. % or at least about 18 wt. % or at least about 19 wt. % or at least about 20 wt. % or at least about 21 wt. % or at least about 22 wt. % or at least about 23 wt. % or at least about 24 wt. % or at least about 25 wt. %.

Embodiment 113. The composite film of embodiment 101, wherein the third anti-reflective coating comprises silica nanoparticles at a concentration of not greater than about 60 wt. % or a total weight of the third anti-reflective coating or not greater than about 58 wt. % or not greater than about 55 wt. % or not greater than about 53 wt. % or not greater than about 50 wt. % or not greater than about 48 wt. % or not greater than about 45 wt. % or not greater than about 43 wt. % or not greater than about 40 wt. % or not greater than about 38 wt. % or not greater than about 35 wt. % or not greater than about 33 wt. % or not greater than about 30 wt. %.

Embodiment 114. The composite film of embodiment 101, wherein the silica nanoparticles in the third anti-reflective coating are surface treated silica nanoparticles.

Embodiment 115. The composite film of embodiment 101, wherein the silica nanoparticles in the third anti-reflective coating are surface treated with polysiloxane, acrylate or a combination thereof.

Embodiment 116. The composite film of embodiment 101, wherein the silica nanoparticles in the third anti-reflective coating are generally solid silica nanoparticles.

Embodiment 117. The composite film of embodiment 101, wherein the silica nanoparticles in the third anti-reflective coating have an average particle size (D50) of at least about 1 nm or at least about 2 nm or at least about 3 nm or at least about 4 nm or at least about 5 nm or at least about 6 nm or at least about 7 nm or at least about 8 nm or at least about 10 nm or at least about 11 nm or at least about 12 nm or at least about 13 nm or at least about 14 nm or at least about 15 nm or at least about 16 nm or at least about 17 nm or at least about 18 nm.

Embodiment 118. The composite film of embodiment 101, wherein the silica nanoparticles in the third anti-reflective coating have an average particle size (D50) of not greater than about 500 nm or not greater than about 400 nm or not greater than about 300 nm or not greater than about 200 nm or not greater than about 100 nm or not greater than about 95 nm or not greater than about 90 nm or not greater than about 85 nm or not greater than about 80 nm or not greater than about 75 nm or not greater than about 65 nm or not greater than about 60 nm or not greater than about 55 nm or not greater than about 50 nm or not greater than about 45 nm or not greater than about 40 nm or not greater than about 35 nm or not greater than about 30 nm or not greater than about 25 nm.

Embodiment 119. The composite film of any one of embodiments 1 and 2, wherein the third anti-reflective coating comprises a wetting agent.

Embodiment 120. The composite film of embodiment 119, wherein the wetting agent comprises BYK-377, BYK-UV 3500, Tego 270, or any combination thereof.

Embodiment 121. The composite film of embodiment 119, wherein the third anti-reflective coating comprises the wetting agent at a concentration of at least about 0.01 wt. % for a total weight of the third anti-reflective coating.

Embodiment 122. The composite film of embodiment 119, wherein the third anti-reflective coating comprises the wetting agent at a concentration of not greater than about 0.3 wt. % for a total weight of the third anti-reflective coating.

Embodiment 123. The composite film of any one of embodiments 1 and 2, wherein the third anti-reflective coating comprises a surface energy modifier.

Embodiment 124. The composite film of embodiment 123, wherein the surface energy modifier comprises BYK-315, BYK-300, BYK-310, BY-378, or any combination thereof.

Embodiment 125. The composite film of embodiment 123, wherein the third anti-reflective coating comprises the surface energy modifier at a concentration of at least about 0.01 wt. % for a total weight of the third anti-reflective coating.

Embodiment 126. The composite film of embodiment 123, wheein the third anti-reflective coating comprises the surface energy modifier at a concentration of not greater than about 0.3 wt. % for a total weight of the third anti-reflective coating.

Embodiment 127. The composite film of any one of embodiments 1 and 2, wherein the third anti-reflective coating comprises a second UV curable acrylate binder.

Embodiment 128. The composite film of embodiment 127, wherein the second UV curable acrylate binder comprises SR351LV, SR355, SR399, tetrafunctional acrylate monomer, pentafunctional acrylate monomers, pentaerythritol Tri-Tetraacrylate (PETIA), Ebecry 140, Ebecryl 180, multifunctional oligomers, or UV resins.

Embodiment 129. The composite film of embodiment 127, wherein the third anti-reflective coating comprises the second UV curable acrylate binder at a concentration of at least about 5.0 wt. % for a total weight of the third anti-reflective coating.

Embodiment 130. The composite film of embodiment 127, wherein the third anti-reflective coating comprises the second UV curable acrylate binder at a concentration of not greater than about 60 wt. % for a total weight of the third anti-reflective coating.

Embodiment 131. A method of forming a composite film, wherein the method comprises: providing a first anti-reflective coating formulation, wherein the first anti-reflective coating formulation comprises: a raw first UV curable acrylate binder component at a concentration of at least about 0.4 wt. % and not greater than about 5.5 wt. % for a total weight of the first anti-reflective coating formulation, a raw photo initiator component at a concentration of at least about 0.2 wt. % and not greater than about 2.0 wt. % for a total weight of the first anti-reflective coating formulation, and silica nanoparticles at a concentration of at least about 0.7 wt. % and not greater than about 1.9 wt. % for a total weight of the first anti-reflective coating formulation, applying the first anti-reflective coating formulation to a transparent substrate; and drying the anti-reflective coating formulation to form a composite film comprising a first anti-reflective coating overlying the transparent substrate, wherein the composite film has a VLT of at least about 93.0%, and wherein the composite film has a haze value of not greater than about 3%.

Embodiment 132. The method of embodiment 131, wherein applying the first anti-reflective coating formulation comprises applying the coating using a Meyer rod, a gravure, dip coating, slot die and other coating methods Embodiment 133. The method of embodiment 131, wherein drying the anti-reflective coating formulation comprises drying the coating in an oven and then curing the coating using a UV light, e-beam or other high energy rays.

The concepts described herein will be further described in the following Examples, which do not limit the scope of the invention described in the claims.

Example 1

Eleven sample composite films S1-S11 were formed according to embodiments described herein.

The first sample composite film S1 was formed according to embodiments described herein by preparing an anti-reflective coating solution including the following raw components mixed in a methyl ethyl ketone (MEK) solution. The raw components include: 1) 3.10 parts by weight of surface treated silica nanoparticles (Nanobyk 3650 dispersion), 2) a first UV curable acrylate binder including 1.1 parts by weight of trimethylopropane triacrylate and 96.52 parts by weight of 1-methoxy-2-propanol, and 3) 0.28 parts by weight of a photo initiator (10.00% solid CPI 6976 solution in MEK). The anti-reflective coating solution was coated onto one side of a 7 mil SH38 PET film using a #3 Meyer rod and then dried in oven at 110° C. for 30 seconds. The dried coating was then cured with UV light to form a first anti-reflective coating on the PET film. The same anti-reflective coating solution was then coated on a second side of a 7 mil SH38 PET film (SKC films, South Korea) using a #3 Meyer rod and then dried in an oven at 110° C. for 30 seconds. The dried coating was then cured with UV light to form a second anti-reflective coating on the PET film.

The second sample composite film S2 was formed according to embodiments described herein by preparing an anti-reflective coating solution including the following raw components mixed in a methyl ethyl ketone solution. The raw components include: 1) 4.00 parts by weight of surface treated silica nanoparticles (Nanobyk 3650 dispersion), 2) a first UV curable acrylate binder including 0.08 parts by weight of trimethylopropane triacrylate) and 75.00 parts by weight of 1-methoxy-2-propanol, 3) a solvent of 20.00 parts of propylene glycol monomethyl ether acetate, and 4) 0.20 parts by weight of a photo initiator (10.00% solid CPI 6976 solution in MEK). The anti-reflective coating solution was coated onto one side of a 7 mil SH38 PET film using a #3 Meyer rod and then dried in an oven at 110° C. for 30 seconds. The dried coating was then cured with UV light to form a first anti-reflective coating on the PET film. The same anti-reflective coating solution was then coated on a second side of a 7 mil SH38 PET film using a #3 Meyer rod and then dried in an oven at 110° C. for 30 seconds. The dried coating was then cured with UV light to form a second anti-reflective coating on the PET film.

The third sample composite film S3 was formed according to embodiments described herein by preparing an anti-reflective coating solution including raw components mixed in a methyl ethyl ketone solution. The raw components include 1) 2.7 parts by weight of surface treated silica nanoparticles (Nanobyk 3650 dispersion), 2) a first UV curable acrylate binder including 1.2 parts by weight of trimethylopropane triacrylate and 95.8 parts by weight of 1-methoxy-2-propanol, and 3) 0.30 parts by weight of a photo initiator (10.00% solid CPI 6976 solution in MEK). The anti-reflective coating solution was coated onto one side of a 7 mil SH38 PET film using a #3 Meyer rod and then dried in an oven at 110° C. for 30 seconds. The dried coating was then cured with UV light to form a first anti-reflective coating on the PET film. The same anti-reflective coating solution was then coated on a second side of a 7 mil SH38 PET film using a #3 Meyer rod and then dried in an oven at 110° C. for 30 seconds. The dried coating was then cured with UV light to form a second anti-reflective coating on the PET film.

The fourth sample composite film S4 was formed according to embodiments described herein by preparing an anti-reflective coating solution including the following raw components mixed in a methyl ethyl ketone solution. The raw components include: 1) 2.34 parts by weight of surface treated silica nanoparticles (Nanobyk 3650 dispersion), 2) a first UV curable acrylate binder including 1.30 parts by weight of trimethylopropane triacrylate and 96.04 parts by weight of 1-methoxy-2-propanol, and 3) 0.32 parts by weight of a photo initiator (10.00% solid CPI 6976 solution in MEK). The anti-reflective coating solution was coated onto one side of a 7 mil SH38 PET film using a #3 Meyer rod and then dried in an oven at 110° C. for 30 seconds. The dried coating was then cured with UV light to form a first anti-reflective coating on the PET film. The same anti-reflective coating solution was then coated on a second side of a 7 mil SH38 PET film using a #3 Meyer rod and then dried in an oven at 110° C. for 30 seconds. The dried coating was then cured with UV light to form a second anti-reflective coating on the PET film.

The fifth sample composite film S5 was formed according to embodiments described herein by preparing an anti-reflective coating solution including the following raw components mixed in a methyl ethyl ketone solution. The raw components include: 1.97 parts by weight of surface treated silica nanoparticles (Nanobyk 3650 dispersion), 2) a first UV curable acrylate binder including 1.40 parts by weight of trimethylopropane triacrylate and 96.28 parts by weight of 1-methoxy-2-propanol, and 3) 0.35 parts by weight of a photo initiator (10.00% solid CPI 6976 solution in MEK). The anti-reflective coating solution was coated onto one side of a 7 mil SH38 PET film using a #3 Meyer rod and then dried in an oven at 110° C. for 30 seconds. The dried coating was then cured with UV light to form a first anti-reflective coating on the PET film. The same anti-reflective coating solution was then coated on a second side of a 7 mil SH38 PET film using a #3 Meyer rod and then dried in an oven at 110° C. for 30 seconds. The dried coating was then cured with UV light to form a second anti-reflective coating on the PET film.

The sixth sample composite film S6 was formed according to embodiments described herein by preparing an anti-reflective coating solution including the following raw components mixed in a methyl ethyl ketone solution. The raw components include: 0.80 parts by weight of surface treated silica nanoparticles (Nanobyk 3650 dispersion), 2) a first UV curable acrylate binder including 1.80 parts by weight of trimethylopropane triacrylate and 96.95 parts by weight of 1-methoxy-2-propanol, and 3) 0.45 parts by weight of a photo initiator (10.00% solid CPI 6976 solution in MEK). The anti-reflective coating solution was coated onto one side of a 7 mil SH38 PET film using a #3 Meyer rod and then dried in an oven at 110° C. for 30 seconds. The dried coating was then cured with UV light to form a first anti-reflective coating on the PET film. The same anti-reflective coating solution was then coated on a second side of a 7 mil SH38 PET film using a #3 Meyer rod and then dried in an oven at 110° C. for 30 seconds. The dried coating was then cured with UV light to form a second anti-reflective coating on the PET film.

The seventh sample composite film S7 was formed according to embodiments described herein by preparing an anti-reflective coating solution including the following raw components mixed in a methyl ethyl ketone solution. The raw components include: 1.20 parts by weight of surface treated silica nanoparticles (Nanobyk 3650 dispersion), 2) a first UV curable acrylate binder including 1.60 parts by weight of Trimethylopropane triacrylate and 96.80 parts by weight of 1-methoxy-2-propanol, and 3) 0.40 parts by weight of a photo initiator (10.00% solid CPI 6976 solution in MEK). The anti-reflective coating solution was coated onto one side of a 7 mil SH38 PET film using a #3 Meyer rod and then dried in an oven at 110° C. for 30 seconds. The dried coating was then cured with UV light to form a first anti-reflective coating on the PET film. The same anti-reflective coating solution was then coated on a second side of a 7 mil SH38 PET film using a #3 Meyer rod and then dried in an oven at 110° C. for 30 seconds. The dried coating was then cured with UV light to form a second anti-reflective coating on the PET film.

The eighth sample composite film S8 was formed according to embodiments described herein by preparing an anti-reflective coating solution including the following raw components mixed in a methyl ethyl ketone solution. The raw components include: 1.60 parts by weight of surface treated silica nanoparticles (Nanobyk 3650 dispersion), 2) a first UV curable acrylate binder including 1.50 parts by weight of Trimethylopropane triacrylate and 96.52 parts by weight of 1-methoxy-2-propanol, and 3) 0.38 parts by weight of a photo initiator (10.00% solid CPI 6976 solution in MEK). The anti-reflective coating solution was coated onto one side of a 7 mil SH38 PET film using a #3 Meyer rod and then dried in an oven at 110° C. for 30 seconds. The dried coating was then cured with UV light to form a first anti-reflective coating on the PET film. The same anti-reflective coating solution was then coated on a second side of a 7 mil SH38 PET film using a #3 Meyer rod and then dried in an oven at 110° C. for 30 seconds. The dried coating was then cured with UV light to form a second anti-reflective coating on the PET film.

The ninth sample composite film was formed according to embodiments described herein by preparing an anti-reflective coating solution including the following raw components mixed in a methyl ethyl ketone solution. The raw components include: 1.20 parts by weight of surface treated silica nanoparticles (Nanobyk 3650 dispersion), 2) a first UV curable acrylate binder including 1.60 parts by weight of trimethylopropane triacrylate and 95.80 parts by weight of propylene glycol monomethyl ether acetate, 3) 0.20 parts by weight of a slip agent (10.00% solid Tego Rad 2500 solution in MEK), and 4) 1.20 parts by weight of a photo initiator (10.00% solid CPI 6976 solution in MEK). The anti-reflective coating solution was coated onto one side of a 7 mil SH38 PET film using a #3 Meyer rod and then dried in an oven at 110° C. for 30 seconds. The dried coating was then cured with UV light to form a first anti-reflective coating on the PET film. The same anti-reflective coating solution was then coated on a second side of a 7 mil SH38 PET film using a #3 Meyer rod and then dried in an oven at 110° C. for 30 seconds. The dried coating was then cured with UV light to form a second anti-reflective coating on the PET film.

The tenth sample composite film S10 was formed according to embodiments described herein by preparing an anti-reflective coating solution as described in the ninth sample composite film S9 above. The anti-reflective coating solution was coated onto one side of a 7 mil SH38 PET film using a #3 Meyer rod and then dried in an oven at 110° C. for 30 seconds. The dried coating was then cured with UV light to form a first anti-reflective coating on the PET film. The same anti-reflective coating solution was then coated on a second side of a 7 mil SH38 PET film using a #3 Meyer rod and then dried in an oven at 110° C. for 30 seconds. The dried coating was then cured with UV light to form a second anti-reflective coating on the PET film. The same anti-reflective coating solution described in S9 was coated and UV cured on both sides of a 2 mil Melinex 453 PET film (DuPont) per the procedure described above. A first pressure sensitive adhesive (PSA) coating (Aroset 1452 solution at 8.3% solid in MEK and toluene) was applied (dried in an over at 110° C. for 2 minutes) to one side of the AR coated 2 mil PET film at about 4.0 μm PSA coating thickness. Then a first AR coated 7 mil PET film was laminated onto the first PSA coating of the AR coated 2 mil Melinex 453 PET film.

The eleventh sample composite film S11 was formed according to embodiments described herein by preparing an anti-reflective coating solution as described in the ninth sample composite film S9 above. The anti-reflective coating solution was coated onto one side of a 7 mil SH38 PET film using a #3 Meyer rod and then dried in an oven at 110° C. for 30 seconds. The dried coating was then cured with UV light to form a first anti-reflective coating on the PET film. The same anti-reflective coating solution was then coated on a second side of a 7 mil SH38 PET film using a #3 Meyer rod and then dried in an oven at 110° C. for 30 seconds. The dried coating was then cured with UV light to form a second anti-reflective coating on the PET film. The same anti-reflective coating solution described in S9 was coated and UV cured on both sides of a 2 mil Melinex 453 PET film (DuPont) per the procedure described above (2 pieces AR coated 2 mil Melinex 453 PET films were made the same way). A first pressure sensitive adhesive (PSA) (Aroset 1452 solution at 8.3% solid in MEK and toluene) coating was applied (dried in an oven at 110° C. for 2 minutes) to one side of the first piece of AR coated 2 mil Melinex 453 PET film at about 4.0 μm PSA coating thickness. Then a first AR coated 7 mil PET film was laminated onto the first PSA coating of the AR coated 2 mil Melinex 453 PET film to make 9 mil composite film. A second PSA (Aroset 1452 solution at 8.3% solid in MEK and toluene) was applied (dried in an oven at 110° C. for 2 minutes) to one side of the second piece of AR coated 2 mil Melinex 453 PET film. Then the 2 mil side of the above 9 mil AR coated composite film was laminated onto the second PSA coating.

Three comparative samples composite films CS1-CS3 were formed.

The first comparative sample composite film CS1 was formed by preparing an anti-reflective coating solution including the following raw components mixed in a methyl ethyl ketone solution. The raw components include: 1) 4.7 parts by weight of surface treated silica nanoparticles (Nanobyk 3650 dispersion), 2) a first UV curable acrylate binder including 0.6 parts by weight of trimethylopropane triacrylate and 94.55 parts by weight of 1-methoxy propanol, and 3) 0.15 parts by weight of a photo initiator (10.00% solid CPI 6976 solution in MEK). The anti-reflective coating solution was coated onto one side of a 7 mil SH38 PET film using a #3 Meyer rod and then dried in an oven at 110° C. for 30 seconds. The dried coating was then cured with UV light to form a first anti-reflective coating on the PET film. The same anti-reflective coating solution was then coated on a second side of a 7 mil SH38 PET film using a #3 Meyer rod and then dried in an oven at 110° C. for 30 seconds. The dried coating was then cured with UV light to form a second anti-reflective coating on the PET film.

The second comparative sample composite film CS2 was formed by preparing an anti-reflective coating solution including the following raw components mixed in a methyl ethyl ketone solution. The raw components include: 1) 5.0 parts by weight of surface treated silica nanoparticles (Nanobyk 3650 dispersion), 2) a first UV curable acrylate binder including 0.50 parts by weight of trimethylopropane triacrylate and 94.37 parts by weight 1-methoxy-2-propanol, and 3) 0.13 parts by weight of a photo initiator (10.00% solid CPI 6976 solution in MEK). The anti-reflective coating solution was coated onto one side of a 7 mil SH38 PET film using a #3 Meyer rod and then dried in an oven at 110° C. for 30 seconds. The dried coating was then cured with UV light to form a first anti-reflective coating on the PET film. The same anti-reflective coating solution was then coated on a second side of a 7 mil SH38 PET film using a #3 Meyer rod and then dried in an oven at 110° C. for 30 seconds. The dried coating was then cured with UV light to form a second anti-reflective coating on the PET film.

A third comparative sample composite film CS3 was formed according to embodiments described herein by preparing an anti-reflective coating solution as described in the ninth sample composite film S9 above. The anti-reflective coating solution was coated onto one side of a 7 mil SH38 PET film using a #3 Meyer rod and then dried in an oven at 110° C. for 30 seconds. The dried coating was then cured with UV light to form a first anti-reflective coating on the PET film. The same anti-reflective coating solution was then coated on a second side of a 7 mil SH38 PET film using a #3 Meyer rod and then dried in an oven at 110° C. for 30 seconds. The dried coating was then cured with UV light to form a second anti-reflective coating on the PET film. A first pressure sensitive adhesive (PSA) (Aroset 1452 solution at 8.3% solid in MEK and toluene) coating was applied (dried in an oven at 110° C. for 2 minutes) to one side of a 2 mil Melinex 453 PET film. Then a first AR coated 7 mil PET film was laminated onto the first PSA coating of the 2 mil Melinex 453 PET film.

The composition of the dried anti-reflective coatings for each of the sample composite films S1-S8 and the comparative sample composite films CS1 and CS2 are summarized in Table 1 below.

TABLE 1

Dried Anti-Reflective Coating Compositions

| Samples | $SiO_2$ Nanoparticle (wt. %) | UV Curable Acrylate Binder (wt. %) | Photo Initiator (wt. %) | $SiO_2$/Binder % Ratio |
|---|---|---|---|---|
| S1 | 41.3 | 58.7 | 2.55 | 0.70 |
| S2 | 55.6 | 44.4 | 2.50 | 1.25 |
| S3 | 36.0 | 64.0 | 2.50 | 0.57 |
| S4 | 31.0 | 69.0 | 2.46 | 0.45 |
| S5 | 26.0 | 74.0 | 2.50 | 0.35 |
| S6 | 10.0 | 90.0 | 2.50 | 0.1 |
| S7 | 15.8 | 84.2 | 2.50 | 0.19 |
| S8 | 21.0 | 79.0 | 7.53 | 0.26 |
| S9 | 15.8 | 84.2 | 7.50 | 0.19 |
| S10 | 15.8 | 84.2 | 7.50 | 0.19 |
| S11 | 15.8 | 84.2 | 7.50 | 0.19 |
| CS1 | 66.2 | 33.8 | 2.50 | 1.96 |
| CS2 | 71.4 | 28.6 | 2.60 | 2.50 |
| CS3 | 15.8 | 84.2 | 7.50 | 0.19 |

The sample composite films S1-S8 and comparative sample composite films CS1 and CS2 were measured for visible light transmission (VLT) and haze value on a BYK Gardner. The results of the VLT and haze value measurements are summarized in Table 2 below.

TABLE 2

VLT and Haze Value Performance

| Samples | VLT (%) | Haze Value (%) | Reflectance (%) |
|---|---|---|---|
| S1 | 95.5 | 1.66 | 4.57 |
| S2 | 96.3 | 1.67 | 4.41 |
| S3 | 95.8 | 2.06 | 4.47 |
| S4 | 95.5 | 1.53 | 4.63 |
| S5 | 95.8 | 1.31 | 4.69 |
| S6 | 95.9 | 1.36 | 4.72 |
| S7 | 95.9 | 1.22 | 4.63 |

TABLE 2-continued

VLT and Haze Value Performance

| Samples | VLT (%) | Haze Value (%) | Reflectance (%) |
|---------|---------|----------------|-----------------|
| S8 | 95.9 | 1.35 | 4.55 |
| S9 | 96.0 | 1.14 | 4.84 |
| S10 | 95.1 | 1.89 | N/A |
| S11 | 94.6 | 2.32 | N/A |
| CS1 | 95.4 | 3.48 | 4.92 |
| CS2 | 95.4 | 3.54 | 4.61 |
| CS3 | 92.1 | 2.13 | N/A |

Note that not all of the activities described above in the general description or the examples are required, that a portion of a specific activity may not be required, and that one or more further activities may be performed in addition to those described. Still further, the order in which activities are listed is not necessarily the order in which they are performed.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A composite film comprising:
a first transparent substrate; and
a first anti-reflective coating overlying a first surface of the first transparent substrate, wherein the first anti-reflective coating comprises:
a first UV curable acrylate binder at a concentration of at least about 40 wt. % and not greater than about 95 wt. % for a total weight of the first anti-reflective coating,
a photo initiator component at a concentration of at least about 2.0 wt. % and not greater than about 10 wt. % for a total weight of the first anti-reflective coating, and
silica nanoparticles dispersed within the first anti-reflective coating at a concentration of at least about 5 wt. % and not greater than about 60 wt. % for a total weight of the first anti-reflective coating, wherein the composite film has a VLT of at least about 93.0%, and wherein the composite film has a haze value of not greater than about 3%.

2. The composite film of claim 1, wherein the first anti-reflective coating has a thickness of at least about 50 nm and not greater than about 500 nm.

3. The anti-reflective coating of claim 1, wherein the silica nanoparticles in the first anti-reflective coating are surface treated silica nanoparticles.

4. The anti-reflective coating of claim 3, wherein the silica nanoparticles in the first anti-reflective coating are surface treated with polysiloxane, acrylate or a combination thereof.

5. The composite film of claim 1, wherein the silica nanoparticles in the first anti-reflective coating are solid silica nanoparticles.

6. The composite film of claim 1, wherein the silica nanoparticles in the first anti-reflective coating have an average particle size (D50) of at least about 1 nm and not greater than about 500 nm.

7. The composite film of claim 1, wherein the first anti-reflective coating comprises a second UV curable acrylate binder.

8. The composite film of claim 7, wherein the first anti-reflective coating comprises the second UV curable acrylate binder at a concentration of at least about 5.0 wt. % and not greater than about 60 wt. % for a total weight of the first anti-reflective coating.

9. The composite film of claim 1, wherein the first anti-reflective coating comprises a wetting agent at a concentration of at least about 0.01 wt. % for a total weight of the first anti-reflective coating.

10. The composite film of claim 9, wherein the first anti-reflective coating comprises the wetting agent at a concentration of not greater than about 0.3 wt. % for a total weight of the first anti-reflective coating.

11. The composite film of claim 1, wherein the first anti-reflective coating comprises a surface energy modifier at a concentration of at least about 0.01 wt. % for a total weight of the first anti-reflective coating.

12. The composite film of claim 11, wherein the first anti-reflective coating comprises the surface energy modifier at a concentration of not greater than about 0.3 wt. % for a total weight of the first anti-reflective coating.

13. The composite film of claim 1, wherein the first anti-reflective coating comprises a second UV curable acrylate binder.

14. The composite film of claim 13, wherein the second UV curable acrylate binder comprises SR351LV, SR355, SR399, tetrafunctional acrylate monomer, pentafunctional acrylate monomers, pentaerythritol Tri-Tetraacrylate (PETIA), Ebecry 140, Ebecryl 180, multifunctional oligomers, or UV resins.

15. The composite film of claim 13, wherein the first anti-reflective coating comprises the second UV curable acrylate binder at a concentration of at least about 5.0 wt. % for a total weight of the first anti-reflective coating.

16. The composite film of claim 15, wherein the first anti-reflective coating comprises the second UV curable acrylate binder at a concentration of not greater than about 60 wt. % for a total weight of the first anti-reflective coating.

17. The composite film of claim 1, wherein the first transparent substrate comprises a PET film.

18. The composite film of claim 17, wherein the first transparent substrate comprises an optically clear PET film.

19. The composite film of claim 17, wherein the first transparent substrate comprises a single layer optically clear PET film.

20. The composite film of claim 19, wherein PET film comprises a thickness of at least about 5 mil.

\* \* \* \* \*